(12) United States Patent
Su et al.

(10) Patent No.: US 12,169,351 B2
(45) Date of Patent: Dec. 17, 2024

(54) IMAGING LENS ASSEMBLY, IMAGE CAPTURING APPARATUS AND ELECTRONIC DEVICE

(71) Applicant: LARGAN PRECISION CO., LTD., Taichung (TW)

(72) Inventors: Heng-Yi Su, Taichung (TW); Ming-Ta Chou, Taichung (TW); Chun-Hua Tsai, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 690 days.

(21) Appl. No.: 17/405,071

(22) Filed: Aug. 18, 2021

(65) Prior Publication Data

US 2022/0100057 A1 Mar. 31, 2022

Related U.S. Application Data

(60) Provisional application No. 63/083,228, filed on Sep. 25, 2020.

(51) Int. Cl.
*G03B 17/12* (2021.01)
*G02B 7/02* (2021.01)
*H04N 23/55* (2023.01)

(52) U.S. Cl.
CPC ............ *G03B 17/12* (2013.01); *G02B 7/025* (2013.01); *H04N 23/55* (2023.01)

(58) Field of Classification Search
CPC ......... G03B 17/12; G03B 7/025; H04N 23/55
See application file for complete search history.

(56) References Cited

U.S. PATENT DOCUMENTS

| 7,534,059 B2 * | 5/2009 | Nishizawa | H04N 23/57 |
| | | | 396/529 |
| 7,570,442 B2 * | 8/2009 | Yuan | G02B 7/025 |
| | | | 359/821 |

(Continued)

FOREIGN PATENT DOCUMENTS

| CN | 101685188 A | 3/2010 |
| CN | 101931740 A | 12/2010 |

(Continued)

OTHER PUBLICATIONS

Mete Bayer, Lens Barrel Optomechanical Design Principles, 20 Optical Engineering 181-186 (1981). (Year: 1981).*

(Continued)

*Primary Examiner* — Cara E Rakowski
*Assistant Examiner* — Wesley Scott Ashton
(74) *Attorney, Agent, or Firm* — McClure, Qualey & Rodack, LLP

(57) ABSTRACT

An imaging lens assembly includes a plurality of plastic lens elements, a plastic lens barrel, a retaining element, a glue material and a first void structure. The plastic lens barrel includes a plate portion and a tube portion. The plate portion has a central hole, and an optical axis of the imaging lens assembly passing through the central hole. The tube portion is extended from the plate portion which is parallel with the optical axis and defining an inner space and the plastic lens elements is disposed in the inner space. The glue material is disposed between one of the plastic lens elements and the tube portion of the plastic lens barrel, and surrounds the one of the plastic lens elements. The first void structure is extended from the central hole to the tube portion. The plastic lens elements are including a first lens element.

10 Claims, 26 Drawing Sheets

(56) References Cited

U.S. PATENT DOCUMENTS

| | | | |
|---|---|---|---|
| 7,751,136 B2 | 7/2010 | Sasaki | |
| 8,482,926 B2 | 7/2013 | Yano et al. | |
| 9,946,048 B2 | 4/2018 | Zhan et al. | |
| 10,191,241 B2 | 1/2019 | Kobori et al. | |
| 10,514,523 B2 | 12/2019 | Lai et al. | |
| 10,558,009 B2 | 2/2020 | Chang et al. | |
| 11,914,217 B2* | 2/2024 | Cheng | G02B 13/18 |
| 2006/0227236 A1* | 10/2006 | Pak | H04N 23/55 |
| | | | 257/E31.127 |
| 2011/0069198 A1* | 3/2011 | Ezawa | G02B 7/025 |
| | | | 348/222.1 |
| 2014/0078606 A1* | 3/2014 | Wu | G02B 7/025 |
| | | | 359/827 |
| 2016/0223829 A1 | 8/2016 | Nagayama | |
| 2018/0120542 A1* | 5/2018 | Chang | G02B 9/34 |
| 2018/0348479 A1* | 12/2018 | Kasama | G02B 9/60 |
| 2020/0209506 A1* | 7/2020 | Liu | H04N 23/57 |
| 2021/0149145 A1* | 5/2021 | Fang | G02B 7/023 |
| 2021/0215899 A1* | 7/2021 | Lamontagne | G03B 17/12 |
| 2022/0299728 A1* | 9/2022 | Wang | G02B 13/001 |

FOREIGN PATENT DOCUMENTS

| | | | | |
|---|---|---|---|---|
| CN | 103031082 A * | 4/2013 | | |
| CN | 103792641 A | 5/2014 | | |
| CN | 104516081 A * | 4/2015 | | G02B 7/021 |
| CN | 105103026 A | 11/2015 | | |
| CN | 105637398 A | 6/2016 | | |
| CN | 106873116 A * | 6/2017 | | G02B 7/021 |
| CN | 108732710 A | 11/2018 | | |
| JP | 3739295 B2 * | 1/2006 | | G02B 7/022 |
| WO | WO-2014088024 A1 * | 6/2014 | | A61B 1/00096 |
| WO | WO-2015151925 A1 * | 10/2015 | | G02B 7/025 |

OTHER PUBLICATIONS

Material Expansion Coefficients, 2018, pp. 17-1 to 17-12 [online], [retrieved May 3, 2024], retrieved from the Internet <URL: https://psec.uchicago.edu/thermal_coefficients/cte_metals_05517-90143.pdf>. (Year: 2018).*

Lens Barrel Assemblies, 2019, pp. 57-61 [online], [retrieved May 3, 2023], retrieved from the Internet <URL: https://spie.org/samples/FG26.pdf>. (Year: 2019).*

Jennifer Harwell, Synopsis of Lens Barrel Optomechanical Design Principles, 2010, pp. 1-6 [online], [retrieved Aug. 7, 2024], retrieved from the Internet <URL: https://wp.optics.arizona.edu/optomech/wp-content/uploads/sites/53/2016/10/J.-Harwell_521-synopsis_Harwell_TechnicalSynopsis.pdf>. (Year: 2010).*

Karl Bitzer et al., Active Alignment for Cameras in Mobile Devices and Automotive Applications, 2010 12th Electronics Packaging Technology Conference 260-264 (2010). (Year: 2010).*

Jim Burge, Mounting of Optical Components, Mounting of Lenses, 2011, pp. 1-46 [online], [retrieved Aug. 7, 2024], retrieved from the Internet <URL: https://wp.optics.arizona.edu/optomech/wp-content/uploads/sites/53/2016/08/26-Mounting-of-lenses-1.pdf>. (Year: 2011).*

* cited by examiner

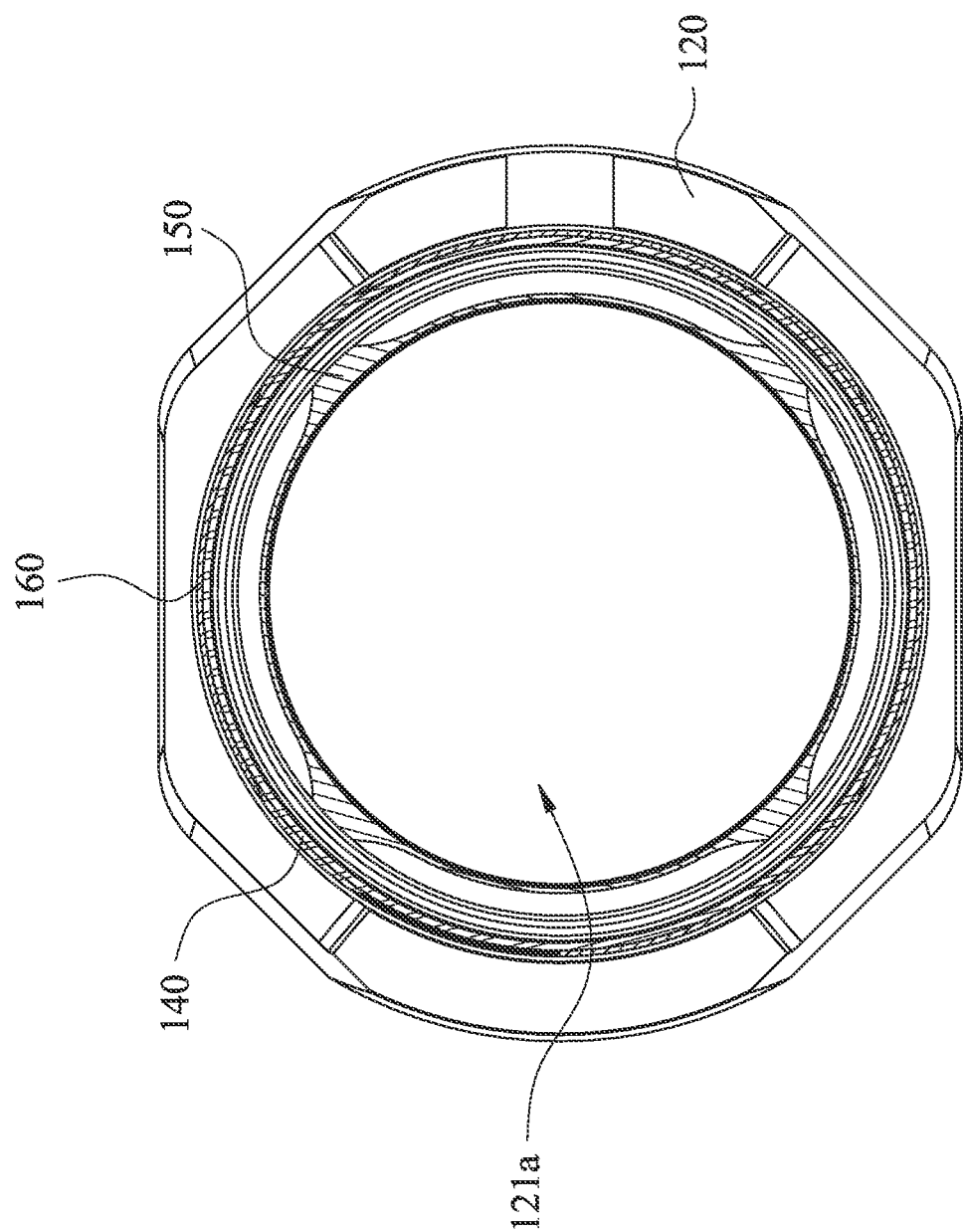

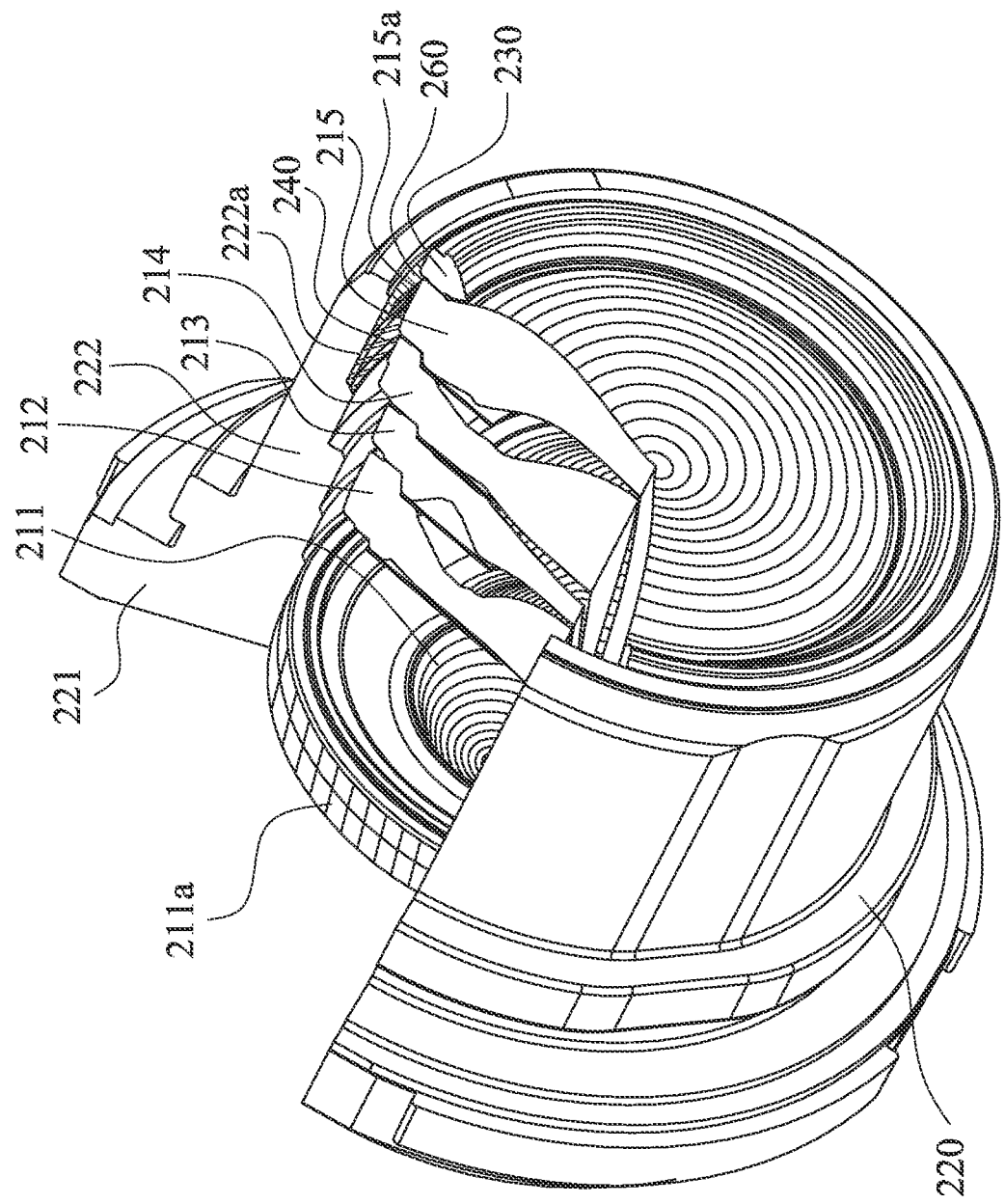

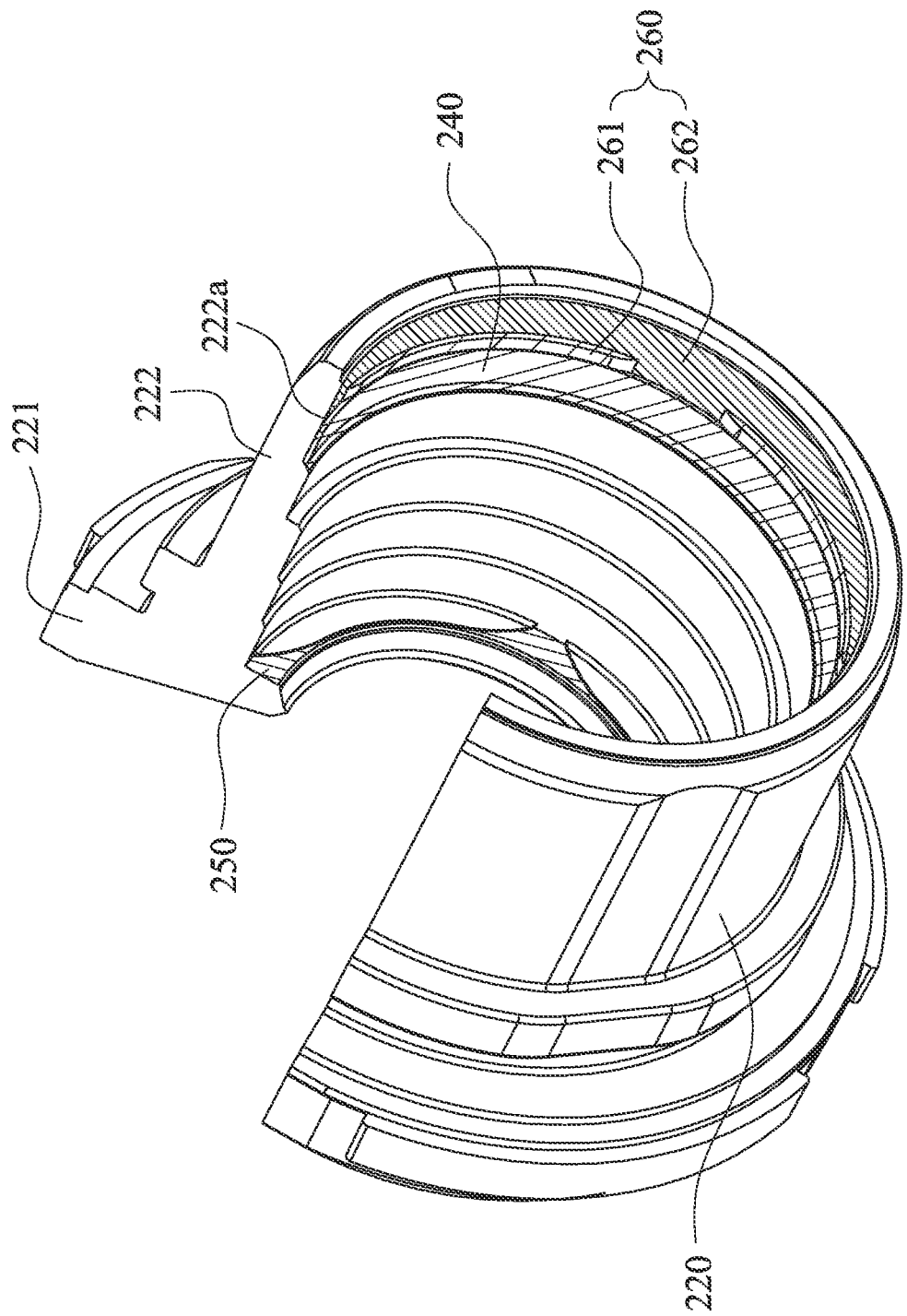

IMAGING LENS ASSEMBLY, IMAGE CAPTURING APPARATUS AND ELECTRONIC DEVICE

RELATED APPLICATIONS

This application claims priority to U.S. Provisional Application Ser. No. 63/083,228, filed Sep. 25, 2020, which is herein incorporated by reference.

BACKGROUND

Technical Field

The present disclosure relates to an imaging lens assembly and an image capturing apparatus. More particularly, the present disclosure relates to an imaging lens assembly and an image capturing apparatus applicable to portable electronic devices.

Description of Related Art

In recent years, portable electronic devices have developed rapidly. For example, intelligent electronic devices and tablets have been filled in the lives of modern people, and imaging lens assemblies and image capturing apparatuses thereof employed in portable electronic devices have also prospered. However, as technology advances, quality requirements of imaging lens assemblies are becoming higher and higher. Therefore, an imaging lens assembly so as to withstand the environmental test under high temperature and high humidity needs to be developed.

SUMMARY

According to one aspect of the present disclosure, an imaging lens assembly includes a plurality of plastic lens elements, a plastic lens barrel, a retaining element, a glue material and a first void structure. The plastic lens elements are arranged in order from an object side to an image side. The plastic lens barrel includes a plate portion and a tube portion. The plate portion has a central hole, and an optical axis of the imaging lens assembly passes through the central hole. The tube portion is extended from the plate portion, which is parallel with the optical axis and defining an inner space, and the plastic lens elements are disposed in the inner space. The retaining element is for fixing the plastic lens elements in the inner space. The glue material is disposed between one of the plastic lens elements and the tube portion of the plastic lens barrel, and surrounds the one of the plastic lens elements. The first void structure is extended from the central hole to the tube portion. The plastic lens elements include a first lens element, and the first lens element is physically contacted with the plate portion of the plastic lens barrel. The first void structure is for maintaining an air gap between the first lens element and the plate portion, and when a thickness of the air gap is d, the following condition is satisfied: 0.5 um<d<40 um.

According to one aspect of the present disclosure, an image capturing apparatus includes the imaging lens assembly of the aforementioned aspect.

According to one aspect of the present disclosure, an electronic device includes the imaging lens assembly of the aforementioned aspect and an image sensor, wherein the image sensor is disposed on an image surface of the imaging lens assembly.

BRIEF DESCRIPTION OF THE DRAWINGS

The present disclosure can be more fully understood by reading the following detailed description of the embodiment, with reference made to the accompanying drawings as follows:

FIG. 1A is a schematic view of an imaging lens assembly according to the 1st embodiment of the present disclosure.

FIG. 2E is a partial cross-sectional view of the imaging lens assembly according to the 2nd embodiment of FIG. 2A.

FIG. 2G is a partial cross-sectional view of the plastic lens barrel according to the 2nd embodiment of FIG. 2A.

DETAILED DESCRIPTION

Figure 1B:
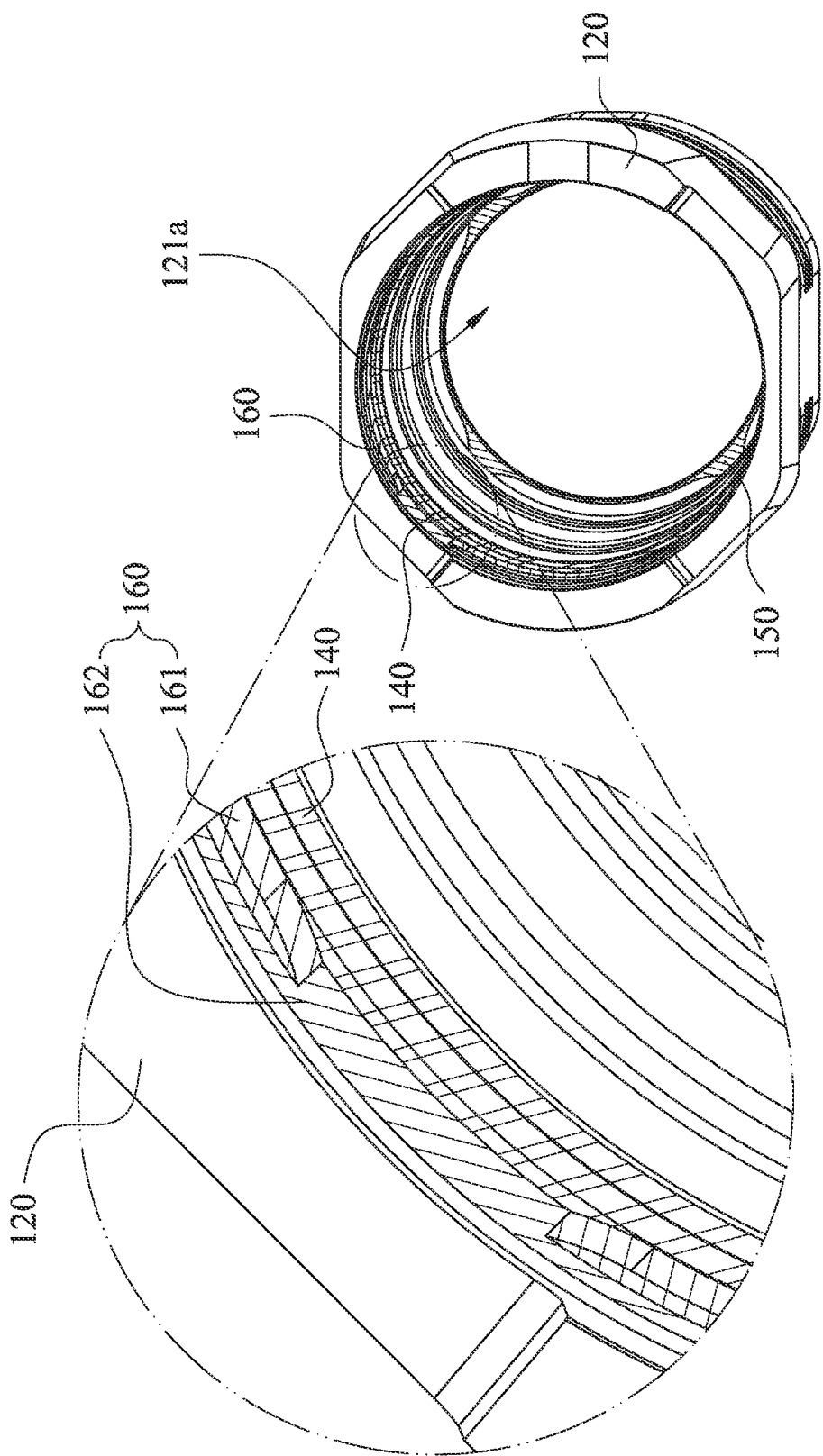
FIG. 1B is a three-dimensional view of the imaging lens assembly according to the 1st embodiment of the present disclosure.

The present disclosure provides an imaging lens assembly including a plurality of plastic lens elements, a plastic lens barrel, a retaining element, a glue material and a first void structure. The plastic lens elements are arranged in order from an object side to an image side. The plastic lens barrel includes a plate portion and a tube portion. The plate portion has a central hole, and an optical axis of the imaging lens assembly passes through the central hole. The tube portion is extended from the plate portion, which is parallel with the optical axis and defines an inner space, and the plastic lens elements are disposed in the inner space. The retaining element is for fixing the plastic lens elements in the inner space. The glue material is disposed between one of the plastic lens elements and the tube portion of the plastic lens barrel, and surrounds the one of the plastic lens elements. The first void structure is extended from the central hole to the tube portion. The plastic lens elements include a first lens element, and the first lens element is physically contacted with the plate portion of the plastic lens barrel. The first void structure is for maintaining an air gap between the first lens element and the plate portion, and when a thickness of the air gap is d, the following condition is satisfied: 0.5 um<d<40 um. Therefore, it is favorable for providing the imaging lens assembly so as to withstand the environmental test under high temperature and high humidity.

In detail, the present disclosure utilizes the retaining element and the glue material to elevate the degree of destructive test and insertion/withdrawal test so as to elevate the degree of stability and the durability of the imaging lens assembly, that is, the retaining element and the glue material can reduce the influence from the environment of the resolution and the optical resolution so as to enhance the reliability of the imaging lens assembly. Furthermore, under the aforementioned environmental test, a coefficient of linear thermal expansion (CTE) of the glue material will change the distances among the assembled plastic lens elements, or the volume of the glue material will over expand and damage the plastic lens barrel. Therefore, under the premise of utilizing the glue material, in order to maintain the durability of the imaging lens assembly and eliminate the influence of stress made by the coefficient of linear thermal expansion of the glue material at the same time, the first void structure is favorable for amortizing the extra volume expansion of the plastic lens elements when the glue material is over-heated so as to prevent the irreversible permanent deformation result from the accumulation of the stress.

Furthermore, the retaining element can be a retainer made by a plastic ring element, or a ring element made by a solidified liquid glue material which coated annularity, but is not limited thereto.

The first lens element can be the only plastic lens element which is physically contacted with the plate portion, others plastic lens elements can be contacted with the tube portion, even uncontacted with any part of plastic lens barrel, and the retaining element can be farther away from the first lens element than the glue material to the first lens element.

The first void structure can be disposed on the plate portion of the plastic lens barrel, the first void structure can include a first step and a first descending surface, and the first step and the first descending surface are for maintaining the air gap between the plate portion and the first lens element which is physically contacted with the plate portion. Due to the ventilation between the air gap and the central hole, when amortize the extra volume expansion of the plastic lens elements, the air in the air gap can be exhausted smoothly, so that the expanded plastic lens elements can extend smoothly by the volume generated by the exhausted air in the air gap.

The tube portion can include a plurality of inner annular surfaces. The inner annular surfaces correspond to the plastic lens elements, respectively, and the glue material is disposed between an outer diameter surface of the one of the plastic lens elements and each of the inner annular surfaces is correspond to the plastic lens elements. Hence, it is favorable for enhancing the package stability of the imaging lens assembly, so that the imaging lens assembly will not be broken easily during suffering from the impact of the external force.

The tube portion of the plastic lens barrel can include a second void structure. The second void structure corresponds to the outer diameter surface of the one of the plastic lens elements, the second void structure can include a second step and a second descending surface, and a part of the glue material is disposed in the second void structure. Therefore, it is favorable for amortizing the extra volume expansion from the heated and expanded glue material so as to decrease the burden of the first void structure.

Between the one of the plastic lens elements which is for disposing the glue material and the first lens element can include at least other two of the plastic lens elements. Therefore, the glue material can fix more plastic lens elements, and compensate the thermal expansion effect of the plastic lens elements due to the temperature variation. The overall focal length of the imaging lens assembly will be influenced by the coefficient of linear thermal expansion of the plastic lens elements, and the thermal expansion effect of the glue material is favorable for discharging the influence of the thermal expansion effect of the plastic lens elements.

The glue material has an opaque property. Therefore, it is favorable for avoiding the unnecessary stray light reflection caused by the surface of the glue material.

When the coefficient of linear thermal expansion of the glue material is c, the following condition is satisfied: 5 ppm/° C.<c<400 ppm/° C. Therefore, the first void structure can adapt more kind of the glue material. Furthermore, some glue material which has better adhesion stability possess higher coefficient of linear thermal expansion. Further, coefficient of linear thermal expansion can be analyzed by a Thermal Mechanical Analyzer, the glue material can be made of an Epoxy resin, and the ppm is parts per million, which is 10 to the power of negative sixth.

When the thickness of the air gap is d, the following condition is satisfied: 0.5 um<d<23 um. Therefore, it is favorable for obtaining better thickness of the first void structure so as to avoid excessive variation of the thickness of the plate portion of the plastic lens barrel caused by too wide thickness of the air gap. Further, the plastic lens barrel is easily to be bent during being distorted by heated, and the dimensional stability of the plastic lens barrel will be not easy to maintain due to the too wide thickness of the air gap. It is worth to be mentioned that, through actual test, when d is 1 um, 2 um, 3 um and 8 um, the dimensional stability of the plastic lens barrel is better, but the range of d is not limited which mentioned above.

When an outer diameter of the first lens element is phi 1, and an outer diameter of the one of the plastic lens elements which connected with the glue material is phi i, the following condition is satisfied: 1.0≤phi i/phi 1<1.43. When the difference of the outer diameter between the plastic lens elements is smaller, the deformational stress direction of the thermal expansion effect will be more predictable and controllable; when the difference of the outer diameter between the plastic lens elements is excessive, the deformational stress direction of the thermal expansion effect will tends to yield the warping of the plastic lens elements.

Each of the aforementioned features of the imaging lens assembly can be utilized in various combinations for achieving the corresponding effects.

The present disclosure provided an image capturing apparatus, which includes the aforementioned imaging lens assembly.

The present disclosure provided an electronic device, which includes the aforementioned image capturing apparatus and an image sensor, wherein the image sensor is disposed on an image surface of the imaging lens assembly.

According to the aforementioned embodiment, specific examples are provided, and illustrated via figures.

1st Embodiment

FIG. 1A is a schematic view of an imaging lens assembly 100 according to the 1st embodiment of the present disclosure. FIG. 1B is a three-dimensional view of the imaging lens assembly 100 according to the 1st embodiment of FIG. 1A. FIG. 1O is a cross-sectional view of the imaging lens assembly 100 according to the 1st embodiment of FIG. 1A. FIG. 1D is a partial schematic view of the imaging lens assembly 100 according to the 1st embodiment of FIG. 1A. FIG. 1E is a partial cross-sectional view of the imaging lens assembly 100 according to the 1st embodiment of FIG. 1A. In FIG. 1A to FIG. 1E, the imaging lens assembly 100 includes a plurality of plastic lens elements, the plastic lens barrel 120, a retaining element 130, a glue material 140, a first void structure 150 and an image surface 170. Therefore, the imaging lens assembly 100 can be provided so as to withstand the environmental test under high temperature and high humidity.

In FIG. 1O to FIG. 1E, the plastic lens elements are arranged in order from an object side to an image side of the imaging lens assembly 100. In the 1st embodiment, the imaging lens assembly 100 includes, in order from the object side to the image side, the plastic lens elements 115, 114, 113, 112 and a first lens element 111. The first lens element 111 is disposed on the side which nearest the image side of the imaging lens assembly 100, the plastic lens element 115 is disposed on the side which nearest the object side of the imaging lens assembly 100, and among the plastic lens element 115 and the first lens element 111 can further include a plurality of plastic lens elements. Furthermore, the plastic lens elements can be disposed according to different imaging demands, and the amount of the plastic lens elements, the structures, the surface shapes and so on, more, the plastic lens elements can disposed other optical elements according to demand, but is not limited thereto.

In FIG. 1O, the plastic lens barrel 120 includes a plate portion 121 and a tube portion 122. The plate portion 121 has a central hole 121a, and an optical axis X of the imaging lens assembly 100 passes through the central hole 121a. The tube portion 122 is extended from the plate portion 121, which is parallel with the optical axis X and defines an inner space (its reference numeral is omitted), which is used to dispose the plastic lens elements in the inner space. Furthermore, the retaining element 130 is for fixing the plastic lens elements in the inner space, and the retaining element 130 can be a retainer made by a plastic ring element, or a ring element made by a solidified liquid glue material which coated annularity, but is not limited thereto. In the 1st embodiment, the first lens element 111 and the plastic lens elements 112, 113, 114, 115 are disposed in the inner space of the tube portion 122, and the retaining element 130 is for fixing the first lens element 111 and the plastic lens elements 112, 113, 114, 115 in the inner space.

The first lens element 111 is physically contacted with the plate portion 121 of the plastic lens barrel 120. Furthermore, only the first lens element 111 of the plastic lens elements is physically contacted with the plate portion 121, other plastic lens elements are contact with the tube portion 122, even do not contact any part of the plastic lens barrel 120, and the retaining element 130 is farther away from the first lens element 111 than the glue material 140. In the 1st embodiment, the plastic lens elements 112, 113, 114, 115 are contacted with the tube portion 122.

Figure 1C:
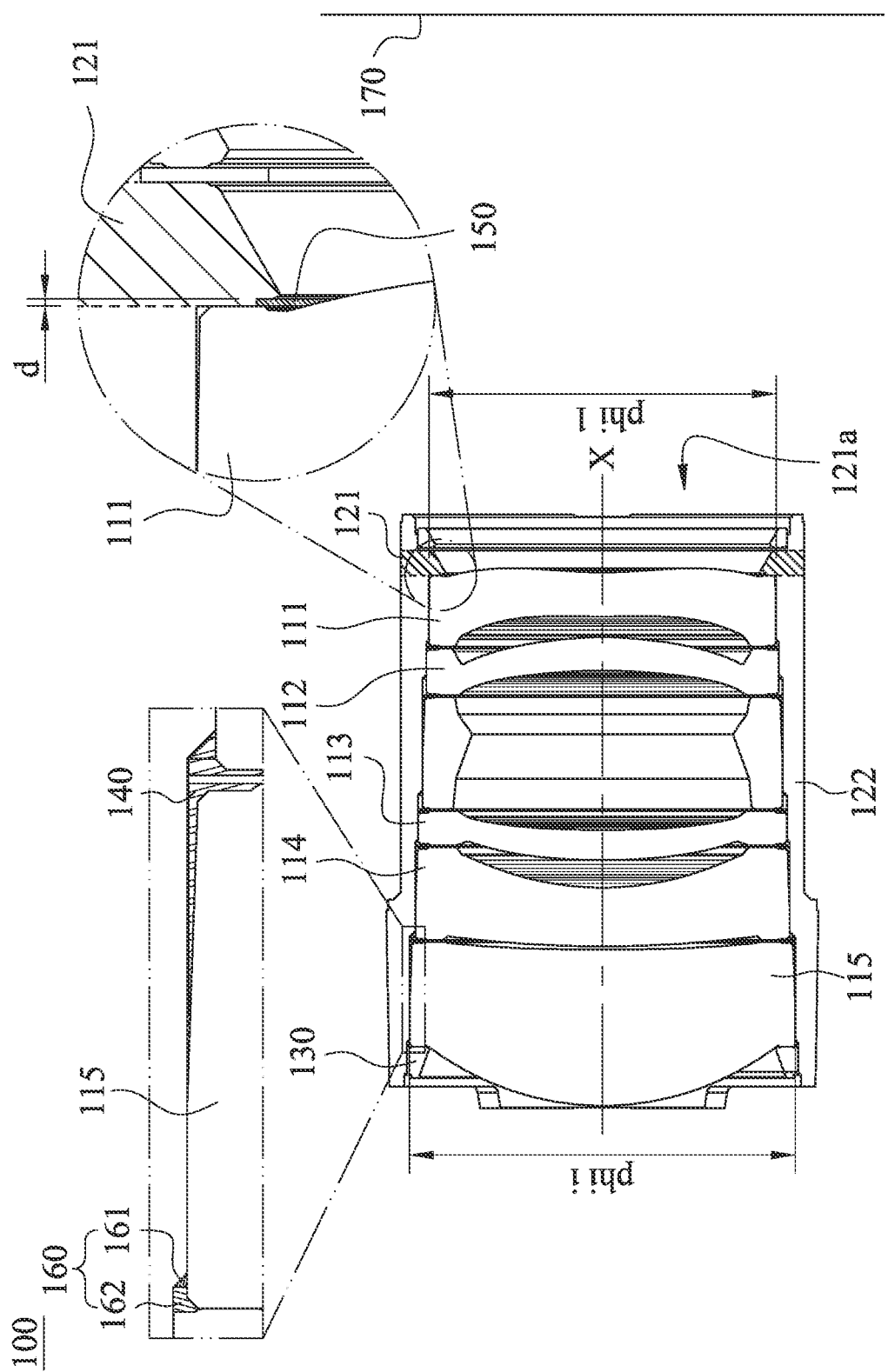
FIG. 1C is a cross-sectional view of the imaging lens assembly according to the 1st embodiment of FIG. 1A.
Figure 1D:
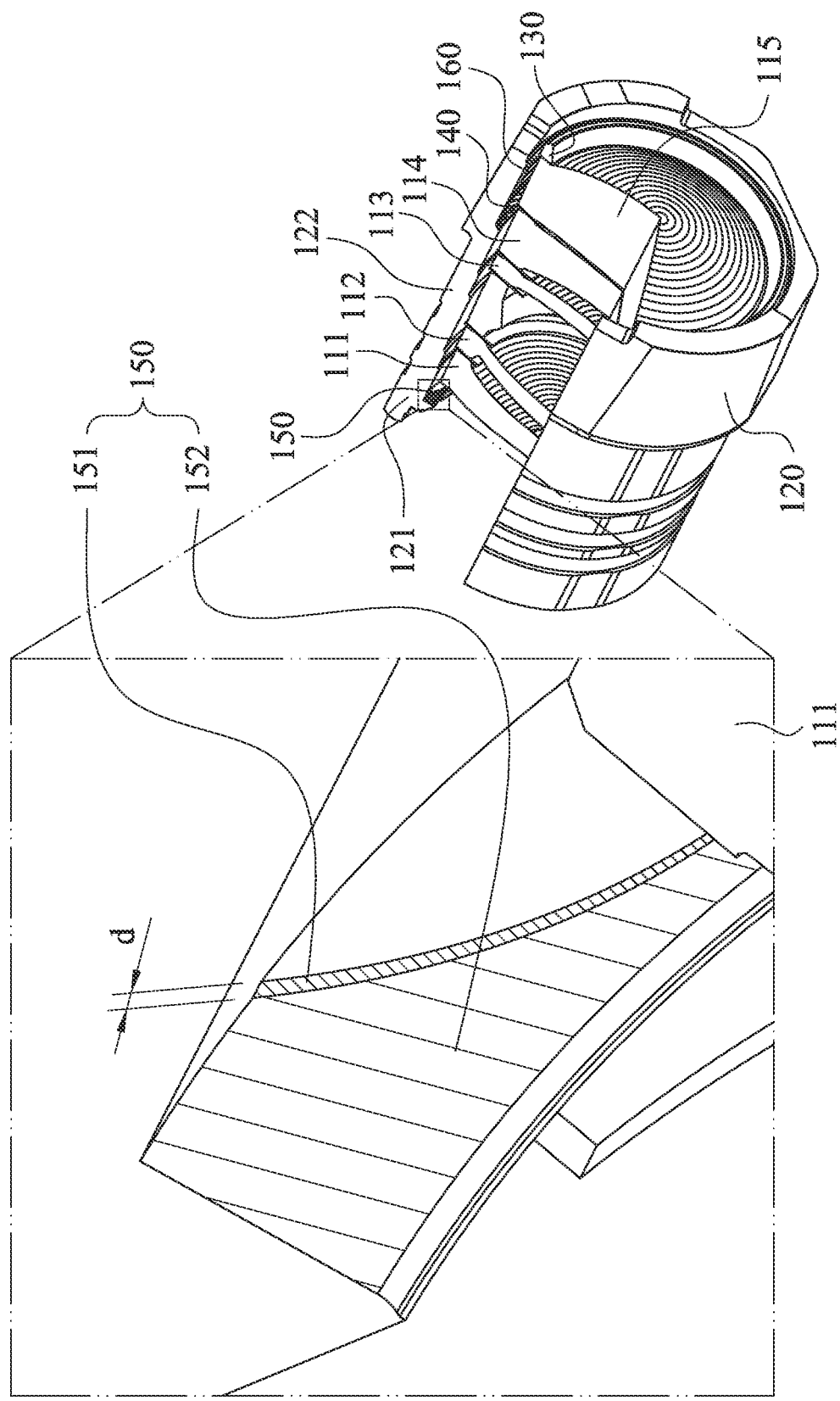
FIG. 1D is a partial schematic view of the imaging lens assembly according to the 1st embodiment of FIG. 1A.
Figure 1E:
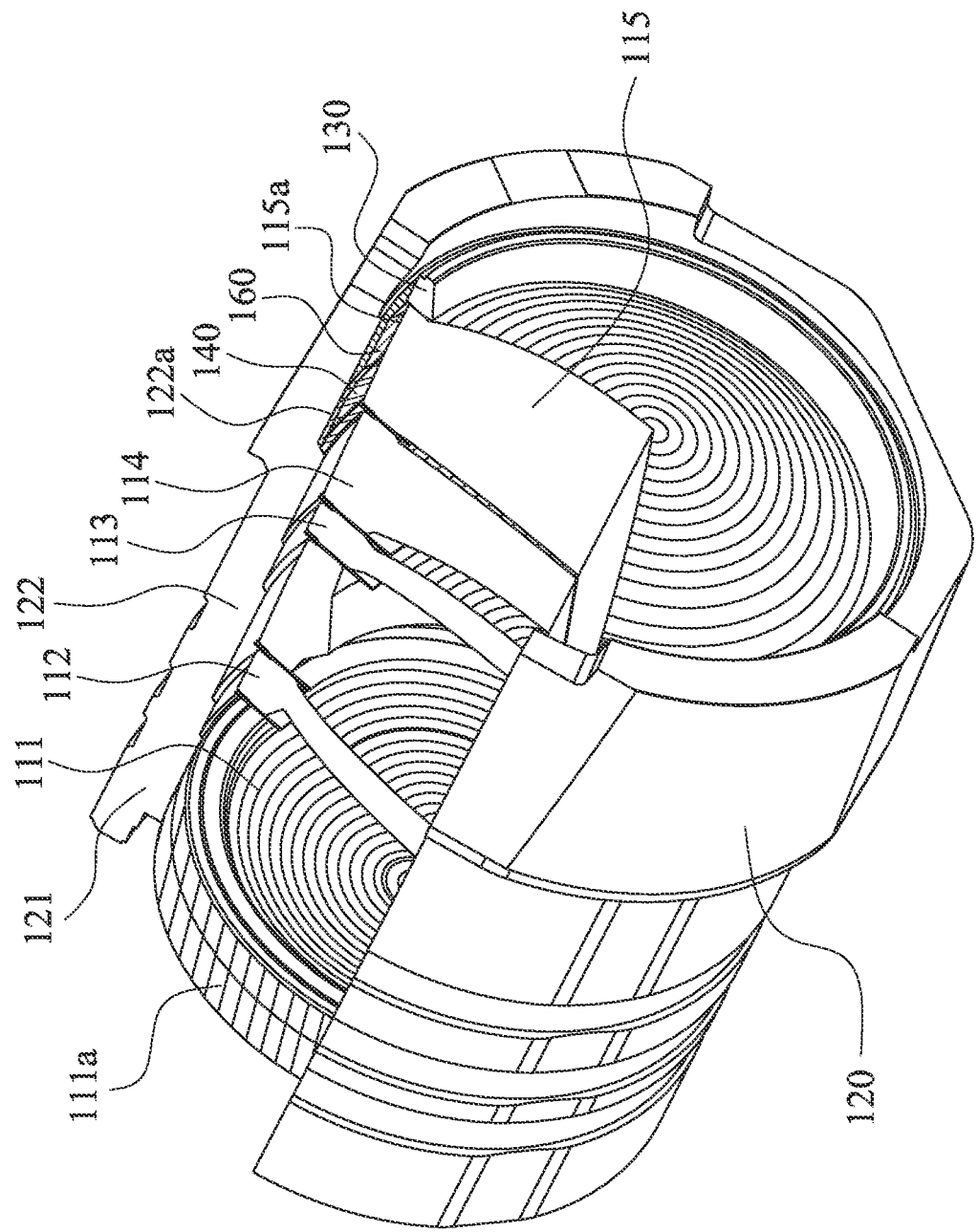
FIG. 1E is a partial cross-sectional view of the imaging lens assembly according to the 1st embodiment of FIG. 1A.

In FIG. 1C to FIG. 1E, the glue material 140 is disposed between one of the plastic lens elements and the tube portion 122 of the plastic lens barrel 120, and surrounds the one of the plastic lens elements. In the 1st embodiment, the glue material 140 is disposed between the plastic lens element 115 and the tube portion 122 of the plastic lens barrel 120, and surrounds the plastic lens element 115. Furthermore, the glue material 140 can be disposed between the plastic lens element 114 and the tube portion 122 of the plastic lens barrel 120, and can surround the plastic lens element 114. In detail, utilizing the retaining element 130 and the glue material 140 is favorable for enhancing the degree of destructive test and insertion/withdrawal test so as to elevate the degree of stability and the durability of the imaging lens assembly 100, that is, the retaining element 130 and the glue material 140 can reduce the influence from the environment of the resolution and the optical resolution so as to enhance the reliability of the imaging lens assembly 100.

Furthermore, the glue material 140 has an opaque property. Therefore, it is favorable for avoiding the unnecessary stray light reflection caused by the surface of the glue material 140.

In FIG. 1O, the first void structure 150 is extended from the central hole 121a to the tube portion 122, and the first void structure 150 is for maintaining an air gap (its reference numeral is omitted) between the first lens element 111 and the plate portion 121. In detail, under the environment test of high temperature and high humidity, the coefficient of linear thermal expansion of the glue material 140 will lead to change the distances between the constructed plastic lens elements, or the over expansion of the volume of the glue material 140 will damage the plastic lens barrel 120. Therefore, under the premise of utilizing the glue material 140, in order to maintain the durability of the imaging lens assembly 100 and eliminate the influence of stress made by the coefficient of linear thermal expansion of the glue material 140 at the same time, the first void structure 150 is favorable for amortizing the extra volume expansion of the plastic lens elements when the glue material 140 is over-heated so as to prevent the irreversible permanent deformation result from the accumulation of the stress. In detail, when the coefficient of linear thermal expansion of the glue material 140 is c, the following condition is satisfied: 5 ppm/° C.<c<400 ppm/° C.

In FIG. 1O and FIG. 1D, the first void structure 150 is disposed on the plate portion 121 of the plastic lens barrel 120, the first void structure 150 includes a first step 151 and a first descending surface 152. The first step 151 and the first descending surface 152 are for maintaining the air gap between the plate portion 121 and the first lens element 111 which is physically contacted with the plate portion 121. Due to the ventilation between the air gap and the central hole 121a, when amortize the extra volume expansion of the plastic lens elements, the air in the air gap can be exhausted smoothly, so that the expanded plastic lens elements can extend smoothly by the volume generated by the exhausted air in the air gap.

In FIG. 1E, the tube portion 122 includes a plurality of inner annular surfaces 122a. The inner annular surfaces 122a are corresponding to the plastic lens elements, respectively, and the glue material 140 is disposed between an outer diameter surface of the one of the plastic lens elements and each of the inner annular surfaces 122a is corresponding to each of the plastic lens elements. In the 1st embodiment, the inner annular surfaces 122a are corresponding to the first lens element 111 and the plastic lens elements 112, 113, 114, 115, the first lens element 111 and the plastic lens element 115 have outer diameter surfaces 111a, 115a, respectively, and the glue material 140 is disposed between the outer diameter surface 115a of the plastic lens element 115 and the inner annular surfaces 122a corresponding to the plastic lens element 115. Hence, it is favorable for enhancing the package stability of the imaging lens assembly 100, so that the imaging lens assembly 100 will not be broken easily during suffering from the impact of the external force.

Figure 1F:
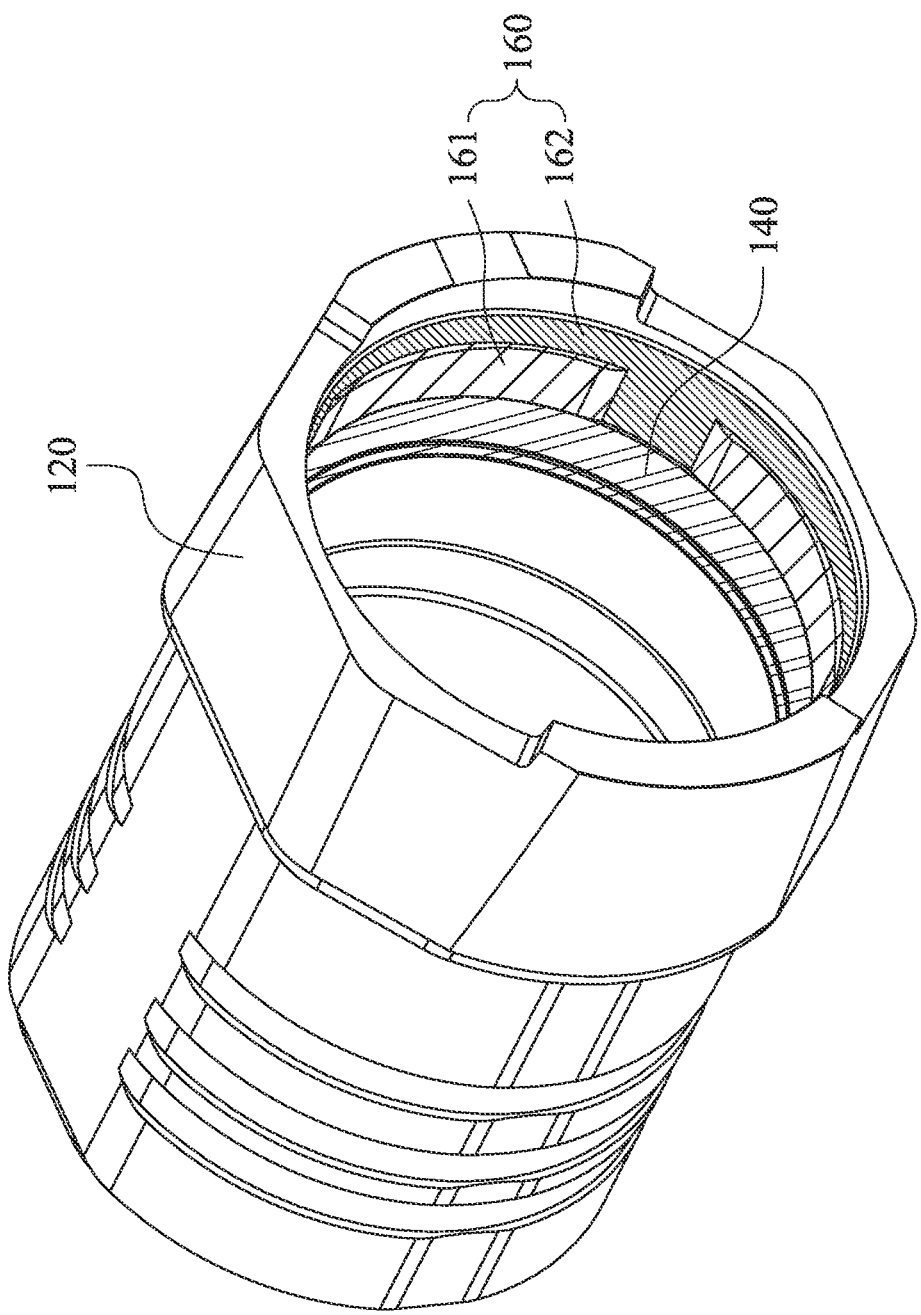
FIG. 1F is another three-dimensional view of the plastic lens barrel according to the 1st embodiment of FIG. 1A.
Figure 1G:
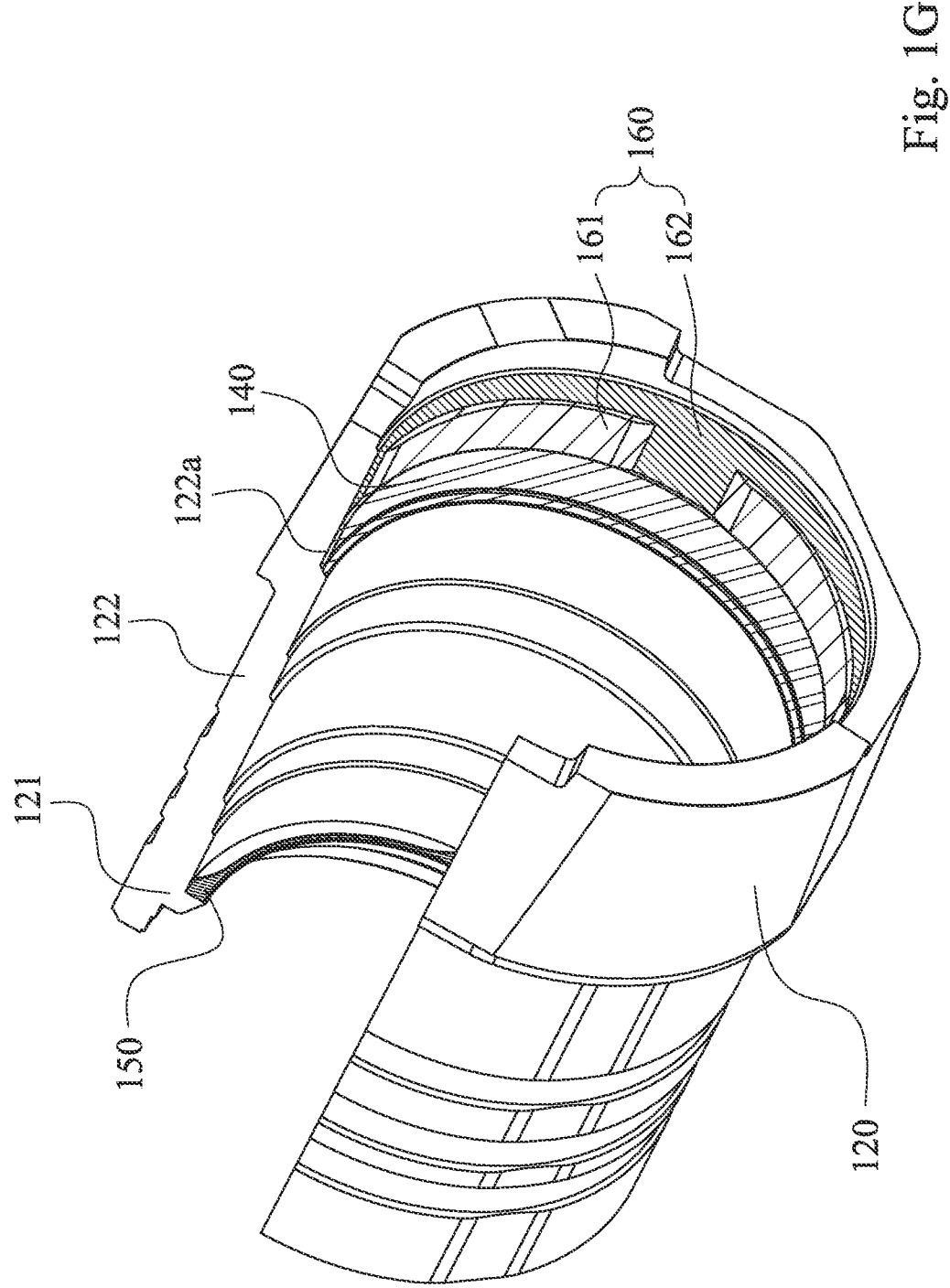
FIG. 1G is a partial cross-sectional view of the plastic lens barrel according to the 1st embodiment of FIG. 1A.

FIG. 1F is another three-dimensional view of the plastic lens barrel 120 of the imaging lens assembly 100 according the 1st embodiment of FIG. 1A. FIG. 1G is a partial cross-sectional view of the plastic lens barrel 120 according to the 1st embodiment of FIG. 1A. In FIG. 1B to FIG. 1G, the tube portion 122 of the plastic lens barrel 120 can further include a second void structure 160. The second void structure 160 is corresponding to the outer diameter surface of one of the plastic lens elements, the second void structure 160 includes a second step 161 and a second descending surface 162, and a part of the glue material 140 is disposed in the second void structure 160. In the 1st embodiment, the second void structure 160 is corresponding to the outer diameter surface 115a of the plastic lens element 115. Therefore, it is favorable for amortizing the extra volume expansion from the heated and expanded glue material 140 so as to decrease the burden of the first void structure 150.

Furthermore, between the one of the plastic lens elements which is for disposing the glue material 140 and the first lens element 111 includes at least other two of the plastic lens elements. In the 1st embodiment, between the plastic lens element 115 and the first lens element 111 includes plastic lens elements 112, 113, 114. Therefore, the glue material 140 can fix more plastic lens elements, and compensate the thermal expansion effect of the plastic lens elements due to the temperature variation. The overall focal length of the imaging lens assembly 100 will be influenced by the coefficient of linear thermal expansion of the plastic lens elements, and the thermal expansion effect of the glue material 140 is favorable for discharging the influence of the thermal expansion effect of the plastic lens elements.

In FIG. 1C and FIG. 1D, when the thickness of the air gap is d, the outer diameter of the first lens element 111 is phi 1, and the outer diameter of one of the plastic lens elements (In the 1st embodiment, one of the plastic lens elements means plastic lens element 115) which is contacted with the glue material 140 is phi i, the aforementioned parameters satisfy the following Table 1.

TABLE 1

| 1st embodiment | | | |
|---|---|---|---|
| d (um) | 20 | phi i (mm) | 5.35 |
| phi 1(mm) | 4.82 | phi i/phi1 | 1.11 |

2nd Embodiment

Figure 2A:
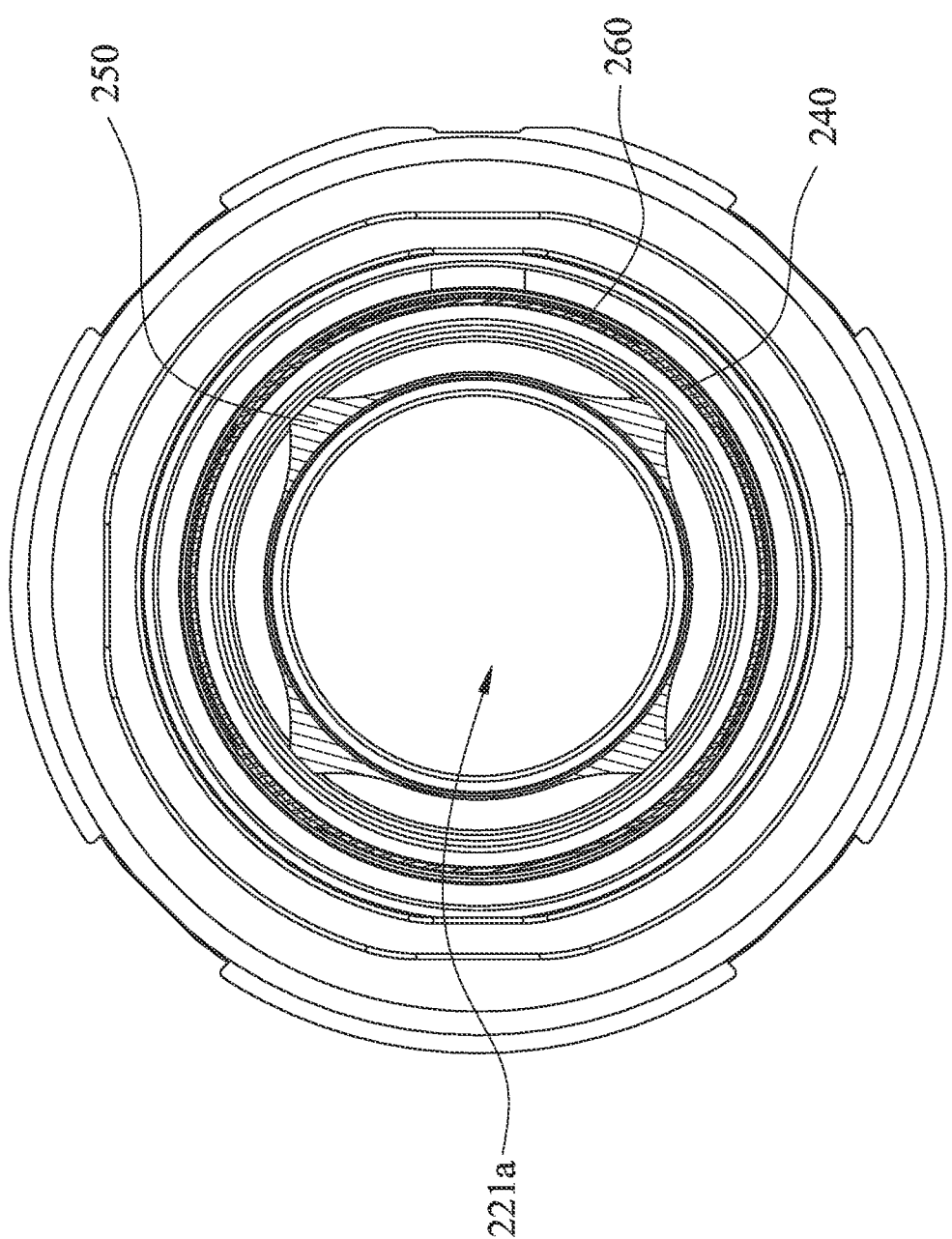
FIG. 2A is a schematic view of an imaging lens assembly according to the 2nd embodiment of the present disclosure.
Figure 2B:
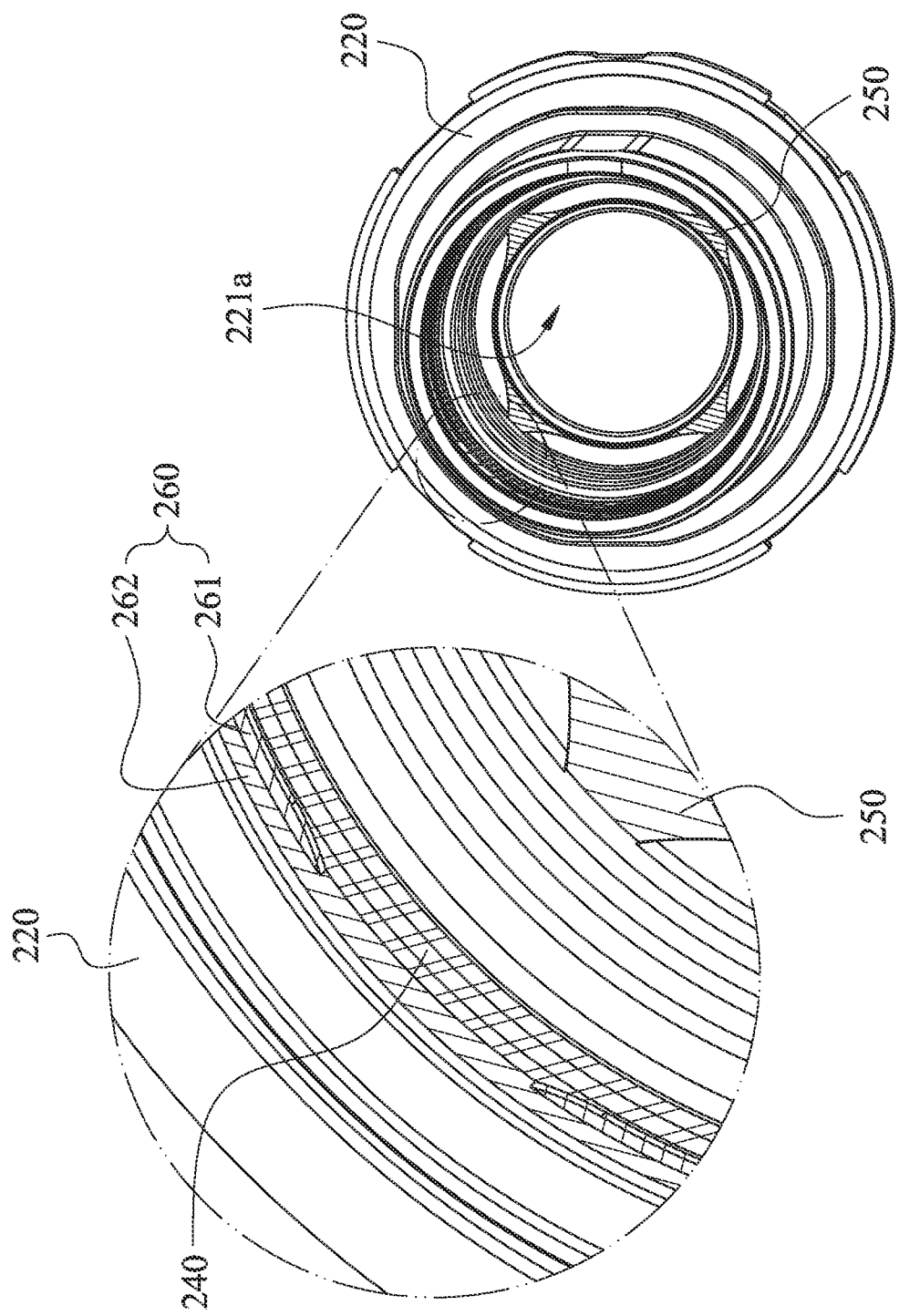
FIG. 2B is a three-dimensional view of the imaging lens assembly according to the 2nd embodiment of the present disclosure.
Figure 2C:
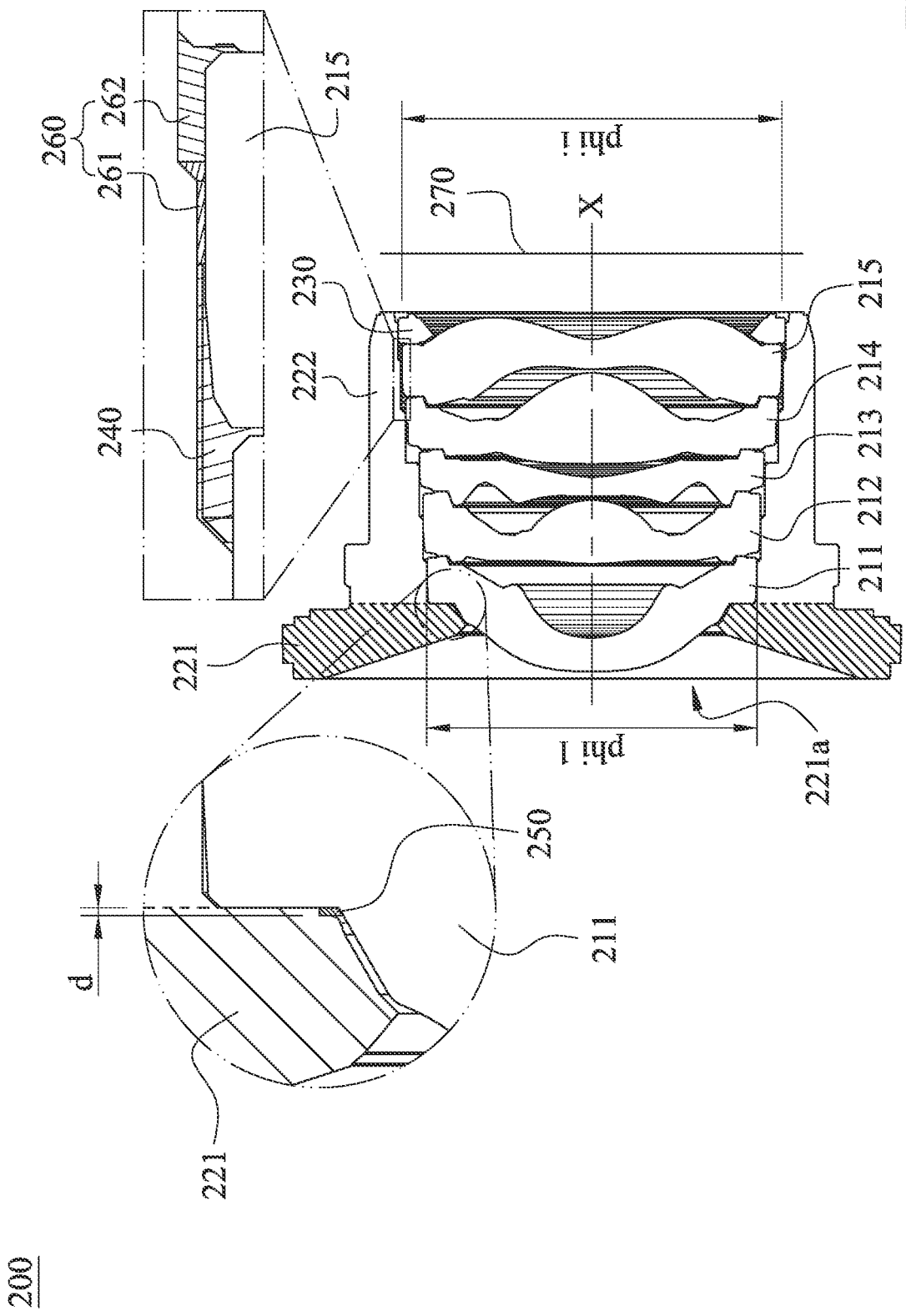
FIG. 2C is a cross-sectional view of the imaging lens assembly according to the 2nd embodiment of FIG. 2A.
Figure 2D:
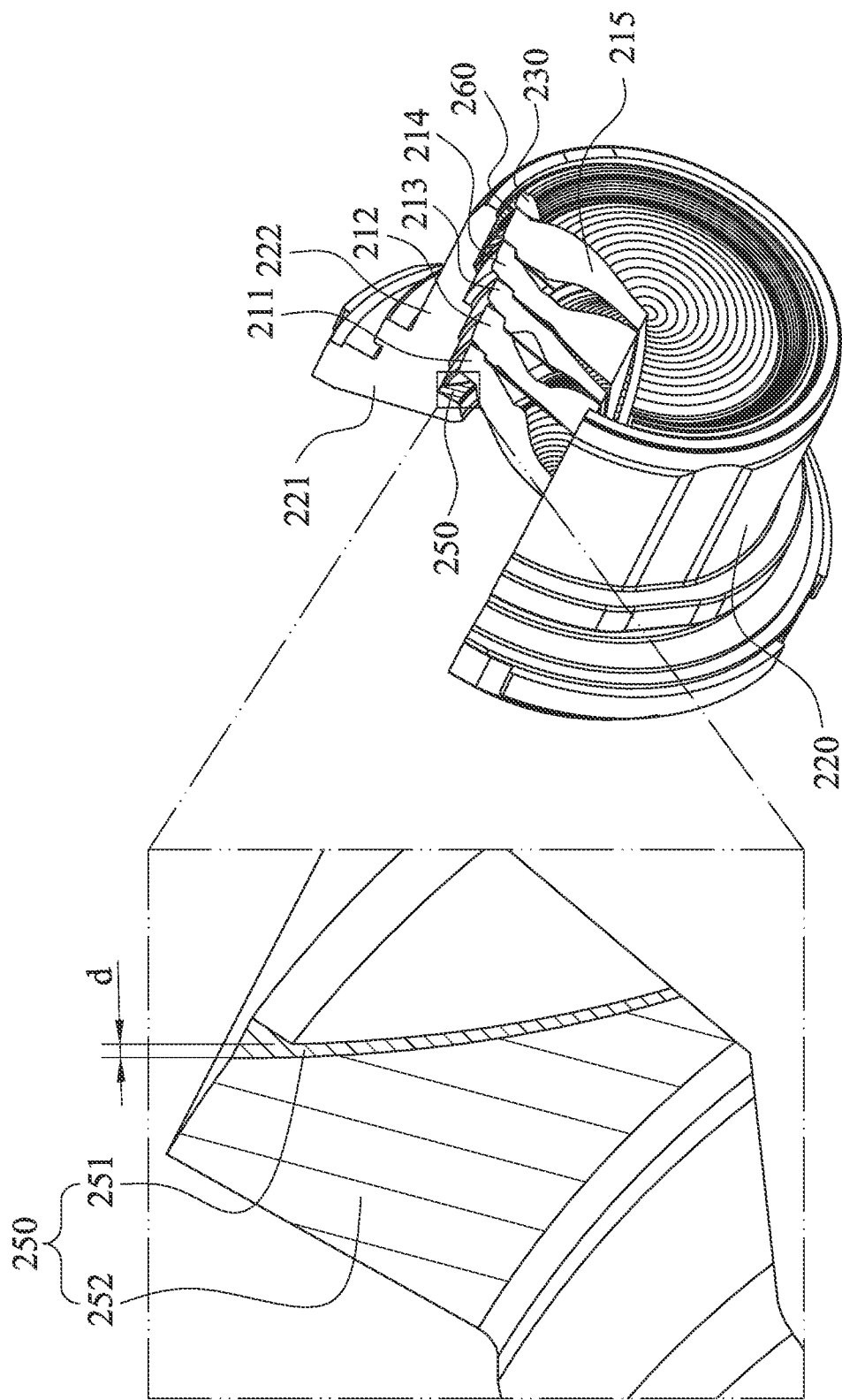
FIG. 2D is a partial schematic view of the imaging lens assembly according to the 2nd embodiment of FIG. 2A.

FIG. 2A is a schematic view of an imaging lens assembly 200 according to the 2nd embodiment of the present disclosure. FIG. 2B is a three-dimensional view of the imaging lens assembly 200 according to the 2nd embodiment of the present disclosure. FIG. 2C is a cross-sectional view of the imaging lens assembly 200 according to the 2nd embodiment of FIG. 2A. FIG. 2D is a partial schematic view of the imaging lens assembly 200 according to the 2nd embodiment of FIG. 2A. FIG. 2E is a partial cross-sectional view of the imaging lens assembly 200 according to the 2nd embodiment of FIG. 2A. In FIG. 2A to FIG. 2E, the imaging lens assembly 200 includes a plurality of plastic lens elements, the plastic lens barrel 220, a retaining element 230, a glue material 240, a first void structure 250 and an image surface 270. Therefore, the imaging lens assembly 200 can be provided so as to withstand the environmental test under high temperature and high humidity.

In FIG. 2C to FIG. 2E, the plastic lens elements are arranged in order from an object side to an image side of the imaging lens assembly 200. In the 2nd embodiment, the imaging lens assembly 200 includes, in order from the object side to the image side, a first lens element 211 and the plastic lens elements 212, 213, 214, 214. The first lens element 211 is disposed on the side which nearest the object side of the imaging lens assembly 200, the plastic lens element 215 is disposed on the side which nearest the image side of the imaging lens assembly 200. Furthermore, the plastic lens elements can be disposed according to different imaging demands, and the amount of the plastic lens elements, the structures, the surface shapes and so on, more, the plastic lens elements can dispose other optical elements according to demand, but is not limited thereto.

In FIG. 2C, the plastic lens barrel 220 includes a plate portion 221 and a tube portion 222. The plate portion 221 has a central hole 221a, and an optical axis X of the imaging lens assembly 200 passes through the central hole 221a. The tube portion 222 is extended from the plate portion 221, which is parallel with the optical axis X and defines an inner space (its reference numeral is omitted), which is used to dispose the plastic lens elements in the inner space. Furthermore, the retaining element 230 is for fixing the plastic lens elements in the inner space, and the retaining element 230 can be a retainer made by a plastic ring element, or a ring element made by a solidified liquid glue material which coated annularity, but is not limited thereto. In the 2nd embodiment, the first lens element 211 and the plastic lens elements 212, 213, 214, 215 are disposed in the inner space of the tube portion 222, and the retaining element 230 is for fixing the first lens element 211 and the plastic lens elements 212, 213, 214, 215 in the inner space.

The first lens element 211 is physically contacted with the plate portion 221 of the plastic lens barrel 220. Furthermore, only the first lens element 211 of the plastic lens elements is physically contacted with the plate portion 221, other plastic lens elements are contacted with the tube portion 222, even do not contact any part of the plastic lens barrel 220, and the retaining element 230 is farther away from the first lens element 211 than the glue material 240 to the first lens element 211. In the 2nd embodiment, the plastic lens elements 212, 214, 215 are contacted with the tube portion 222, and the plastic lens element 213 is not contacted with any part of the plastic lens barrel 220.

In FIG. 2C to FIG. 2E, the glue material 240 is disposed between one of the plastic lens elements and the tube portion 222 of the plastic lens barrel 220, and surrounds the one of the plastic lens elements. In the 2nd embodiment, the glue material 240 is disposed between the plastic lens element 215 and the tube portion 222 of the plastic lens barrel 220, and surrounds the plastic lens element 215. Furthermore, the glue material 240 can be further disposed between the plastic lens element 214 and the tube portion 222 of the plastic lens barrel 220, and can surround the plastic lens element 214. In detail, utilizing the retaining element 230 and the glue material 240 is favorable for enhancing the degree of destructive test and insertion/withdrawal test so as to elevate the degree of stability and the durability of the imaging lens assembly 200, that is, the retaining element 230 and the glue material 240 can reduce the influence from the environment of the resolution and the optical resolution so as to enhance the reliability of the imaging lens assembly 200.

Furthermore, the glue material 240 has an opaque property. Therefore, it is favorable for avoiding the unnecessary stray light reflection caused by the surface of the glue material 240.

In FIG. 2C, the first void structure 250 is extended from the central hole 221a to the tube portion 222, and the first void structure 250 is for maintaining an air gap (its reference numeral is omitted) between the first lens element 211 and the plate portion 221. In detail, under the environment test of high temperature and high humidity, the coefficient of linear thermal expansion of the glue material 240 will lead to change the distances between the constructed plastic lens elements, or the over expansion of the volume of the glue material 240 will damage the plastic lens barrel 220. Therefore, under the premise of utilizing the glue material 240, in order to maintain the durability of the imaging lens assembly 200 and eliminate the influence of stress made by the coefficient of linear thermal expansion of the glue material 240 at the same time, the first void structure 250 is favorable for amortizing the extra volume expansion of the plastic lens elements when the glue material 240 is over-heated so as to prevent the irreversible permanent deformation result from the accumulation of the stress. In detail, when the coefficient of linear thermal expansion of the glue material 240 is c, the following condition is satisfied: 5 ppm/° C.<c<400 ppm/° C.

In FIG. 2C and FIG. 2D, the first void structure 250 is disposed on the plate portion 221 of the plastic lens barrel 220, the first void structure 250 includes a first step 251 and a first descending surface 252. The first step 251 and the first descending surface 252 are for maintaining the air gap between the plate portion 221 and the first lens element 211 which is physically contacted with the plate portion 221. Due to the ventilation between the air gap and the central hole 221a, when amortize the extra volume expansion of the plastic lens elements, the air in the air gap can be exhausted smoothly; so that the expanded plastic lens elements can extend smoothly by the volume generated by the exhausted aft in the air gap.

In FIG. 2E, the tube portion 222 includes a plurality of inner annular surfaces 222a. The inner annular surfaces 222a are corresponding to the plastic lens elements, respectively, and the glue material 240 is disposed between an outer diameter surface of one of the plastic lens elements and each of the inner annular surfaces 222a is corresponding to each of the plastic lens elements. In the 2nd embodiment, the inner annular surfaces 222a are corresponding to the first lens element 211 and the plastic lens elements 212, 213, 214, 215, the first lens element 211 and the plastic lens element 215 have outer diameter surfaces 211a, 215a, respectively, and the glue material 240 is disposed between the outer diameter surface 215a of the plastic lens element 215 and the inner annular surfaces 222a corresponding to the plastic lens element 215. Hence, it is favorable for enhancing the package stability of the imaging lens assembly 200, so that the imaging lens assembly 200 will not be broken easily during suffering from the impact of the external force.

Figure 2F:
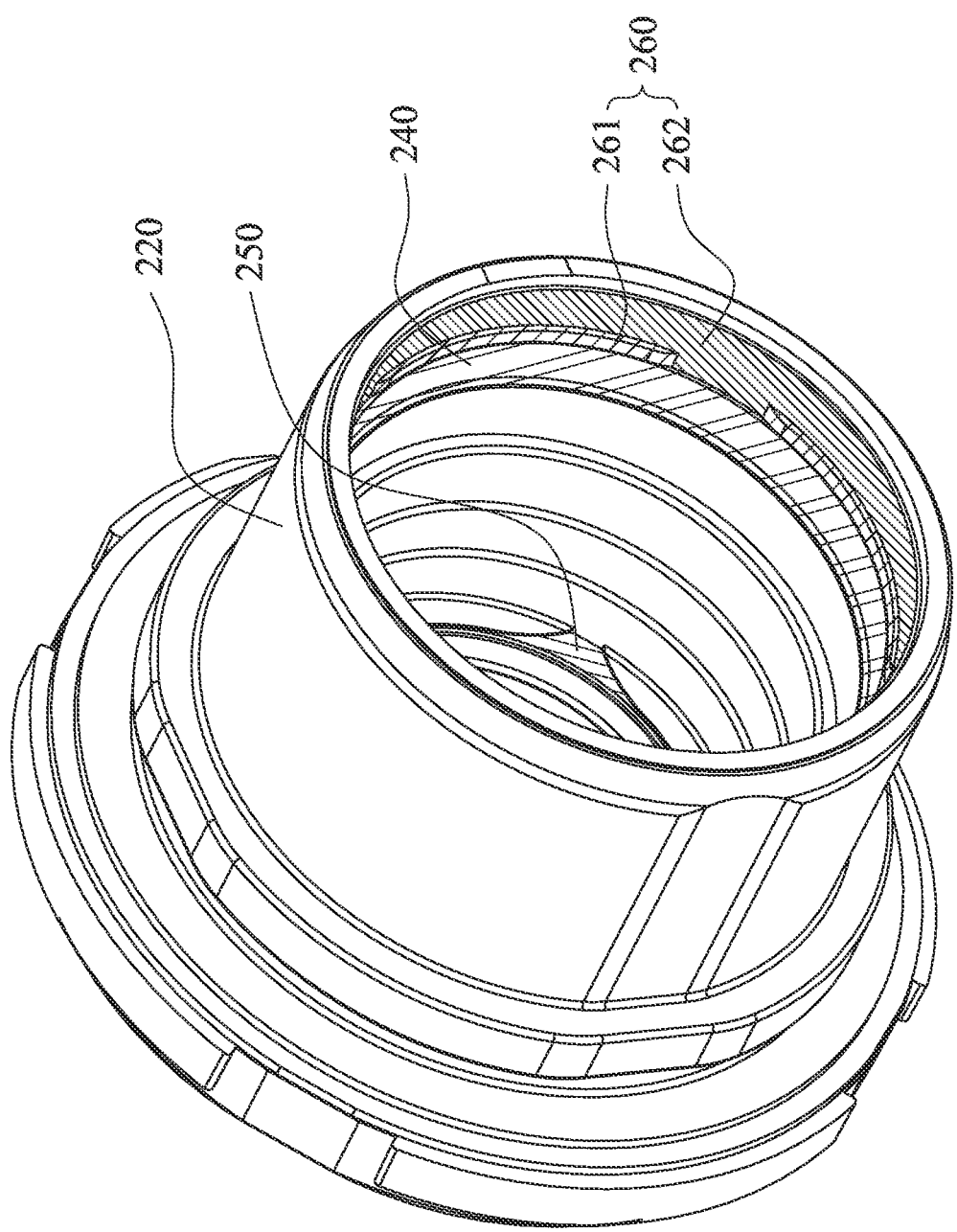
FIG. 2F is another three-dimensional view of the plastic lens barrel according the 2nd embodiment of FIG. 2A.

FIG. 2F is another three-dimensional view of the plastic lens barrel 220 according to the 2nd embodiment of FIG. 2A. FIG. 2G is a partial cross-sectional view of the plastic lens barrel 220 according to the 2nd embodiment of FIG. 2A. In FIG. 2B to FIG. 2G, the tube portion 222 of the plastic lens barrel 220 can further include a second void structure 260. The second void structure 260 is corresponding to the outer diameter surface of one of the plastic lens elements, the second void structure 260 includes a second step 261 and a second descending surface 262, and a part of the glue material 240 is disposed in the second void structure 260. In the 2nd embodiment, the second void structure 260 is corresponding to the outer diameter surface 215a of the plastic lens element 215. Therefore, it is favorable for amortizing the extra volume expansion from the heated and expanded glue material 240 so as to decrease the burden of the first void structure 250.

Furthermore, between the one of the plastic lens elements which is for disposing the glue material 240 and the first lens element 211 includes at least other two of the plastic lens elements. In the 2nd embodiment, between the plastic lens element 215 and the first lens element 211 includes plastic lens elements 212, 213, 214. Therefore, the glue material 240 can fix more plastic lens elements, and compensate the thermal expansion effect of the plastic lens elements due to the temperature variation. The overall focal length of the imaging lens assembly 200 will be influenced by the coefficient of linear thermal expansion of the plastic lens elements, and the thermal expansion effect of the glue material 240 is favorable for discharging the influence of the thermal expansion effect of the plastic lens elements.

In FIG. 2C and FIG. 2D, when the thickness of the air gap is d, the outer diameter of the first lens element 211 is phi 1, and the outer diameter of one of the plastic lens elements (In the 2nd embodiment, one of the plastic lens elements means plastic lens element 215) which is contacted with the glue material 240 is phi i, the aforementioned parameters satisfy the following Table 2.

TABLE 2

| 2nd embodiment | | | |
|---|---|---|---|
| d (um) | 20 | phi i (mm) | 4.95 |
| phi 1(mm) | 4.3 | phi i/phi1 | 1.15 |

3rd Embodiment

Figure 3A:
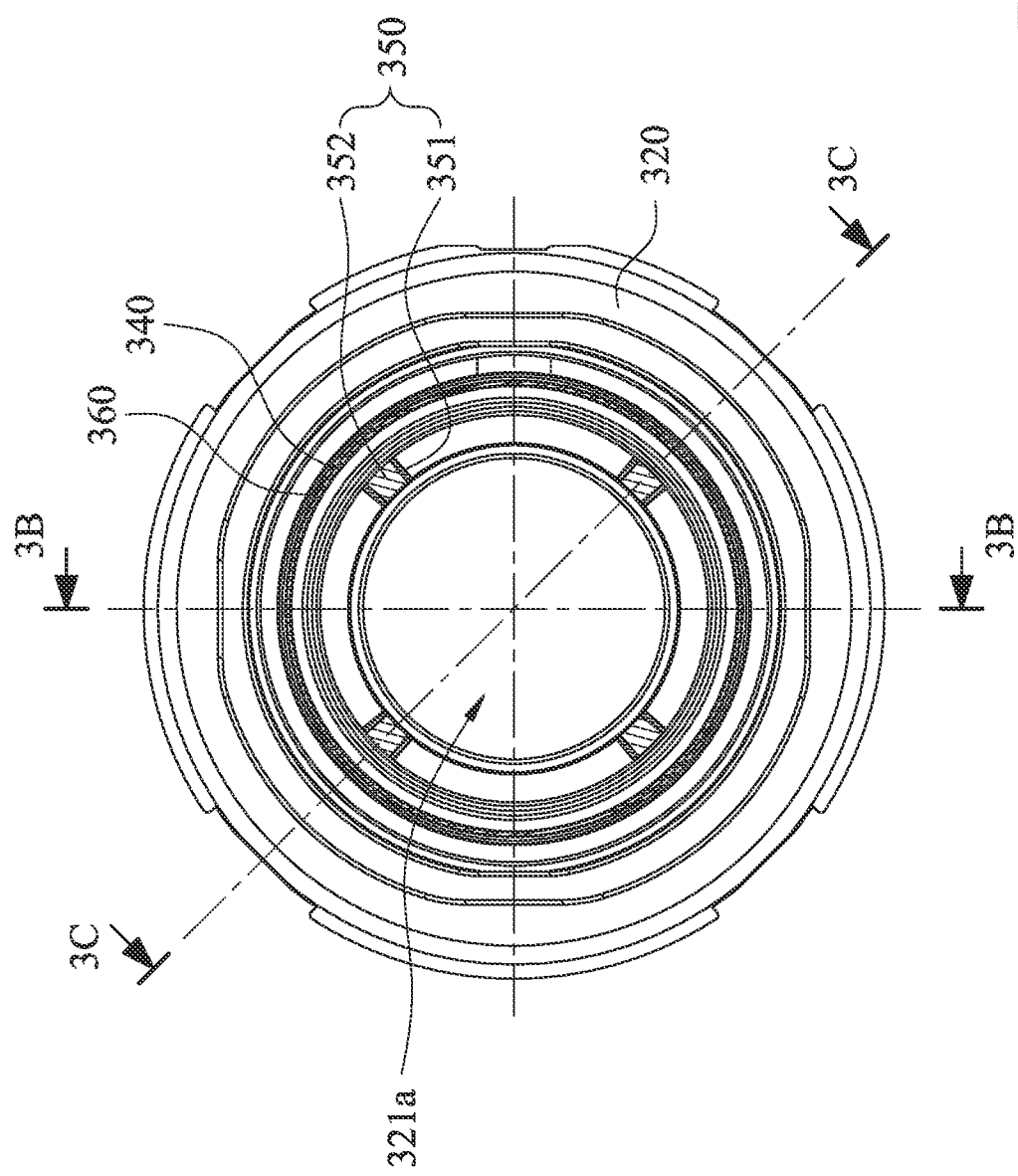
FIG. 3A is a schematic view of an imaging lens assembly according to the 3rd embodiment of the present disclosure.
Figure 3B:
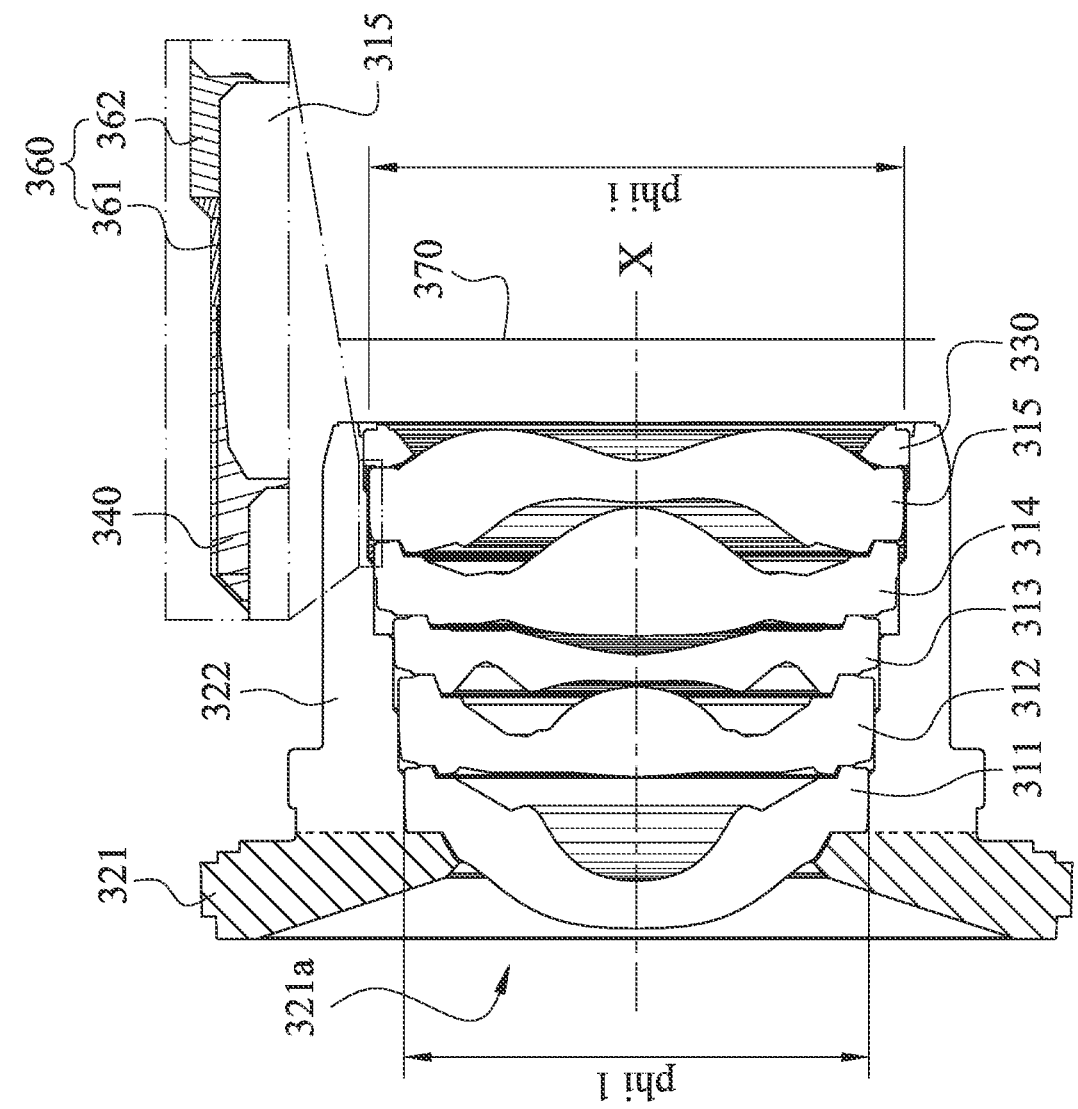
FIG. 3B is a cross-sectional view along the line 3B to 3B of the imaging lens assembly according to the 3rd embodiment of FIG. 3A.
Figure 3C:
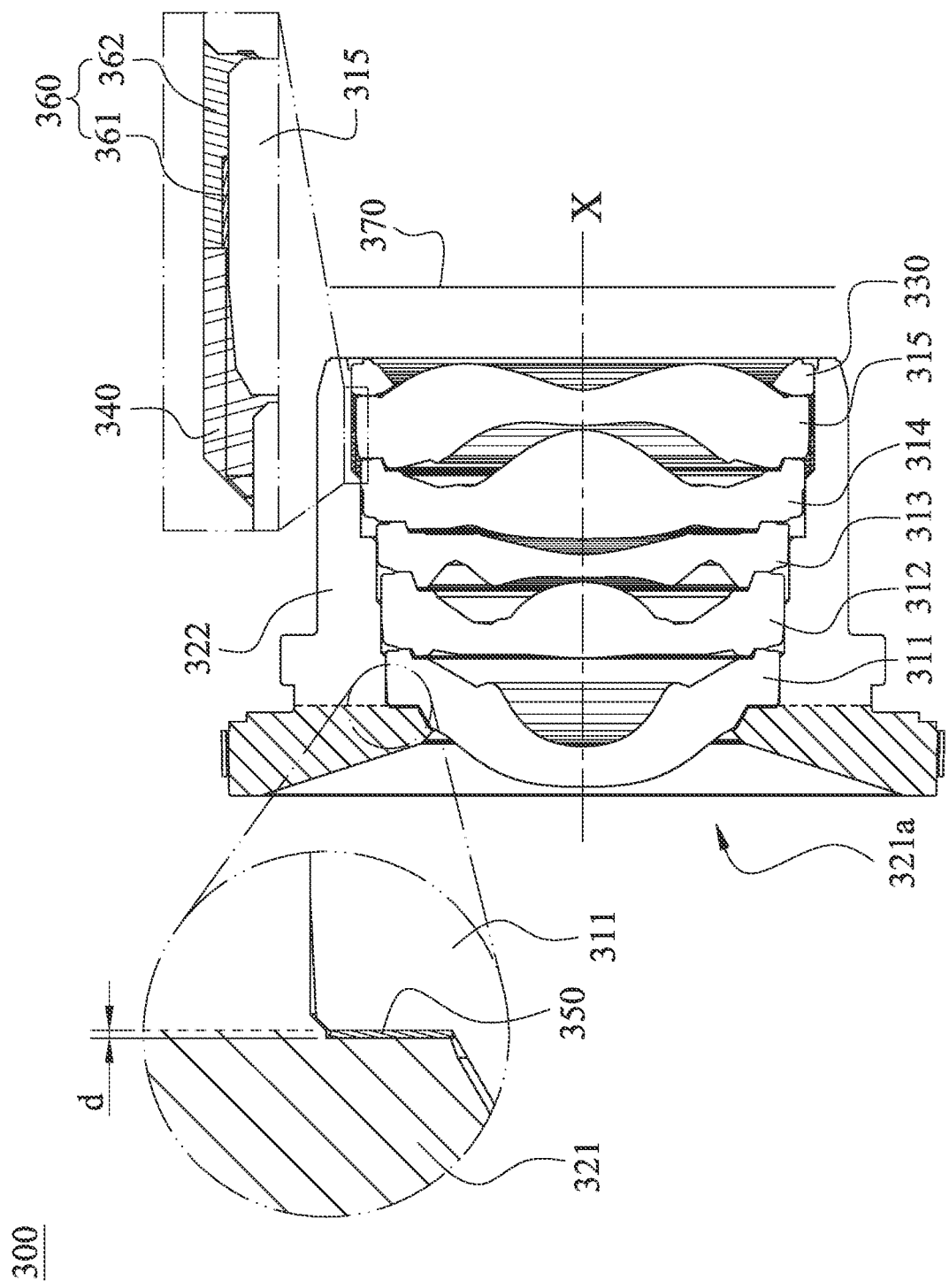
FIG. 3C is a cross-sectional view along the line 3C to 3C of the imaging lens assembly according to the 3rd embodiment of FIG. 3A.
Figure 3D:
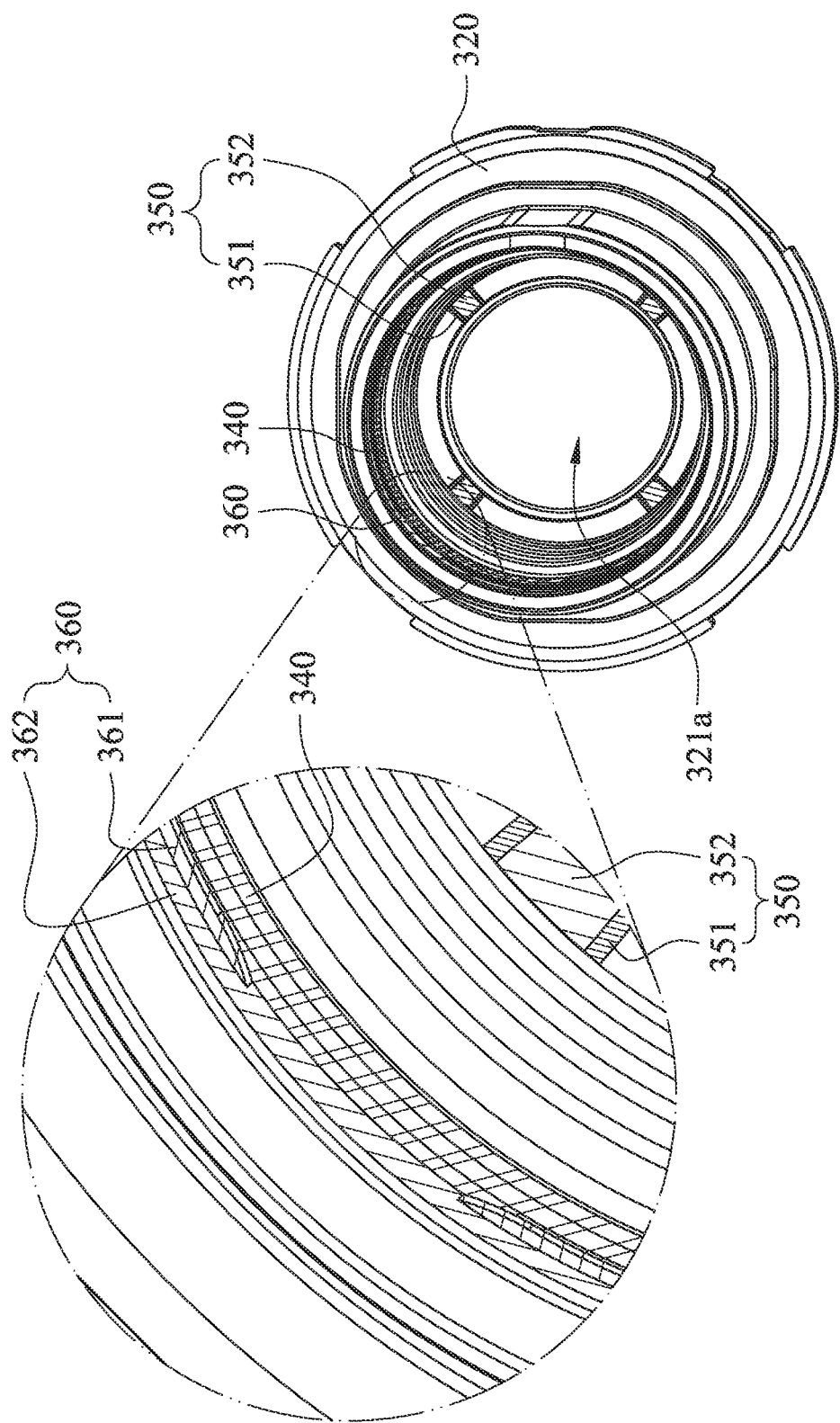
FIG. 3D is a three-dimensional view of the imaging lens assembly according to the 3rd embodiment of FIG. 3A.
Figure 3E:
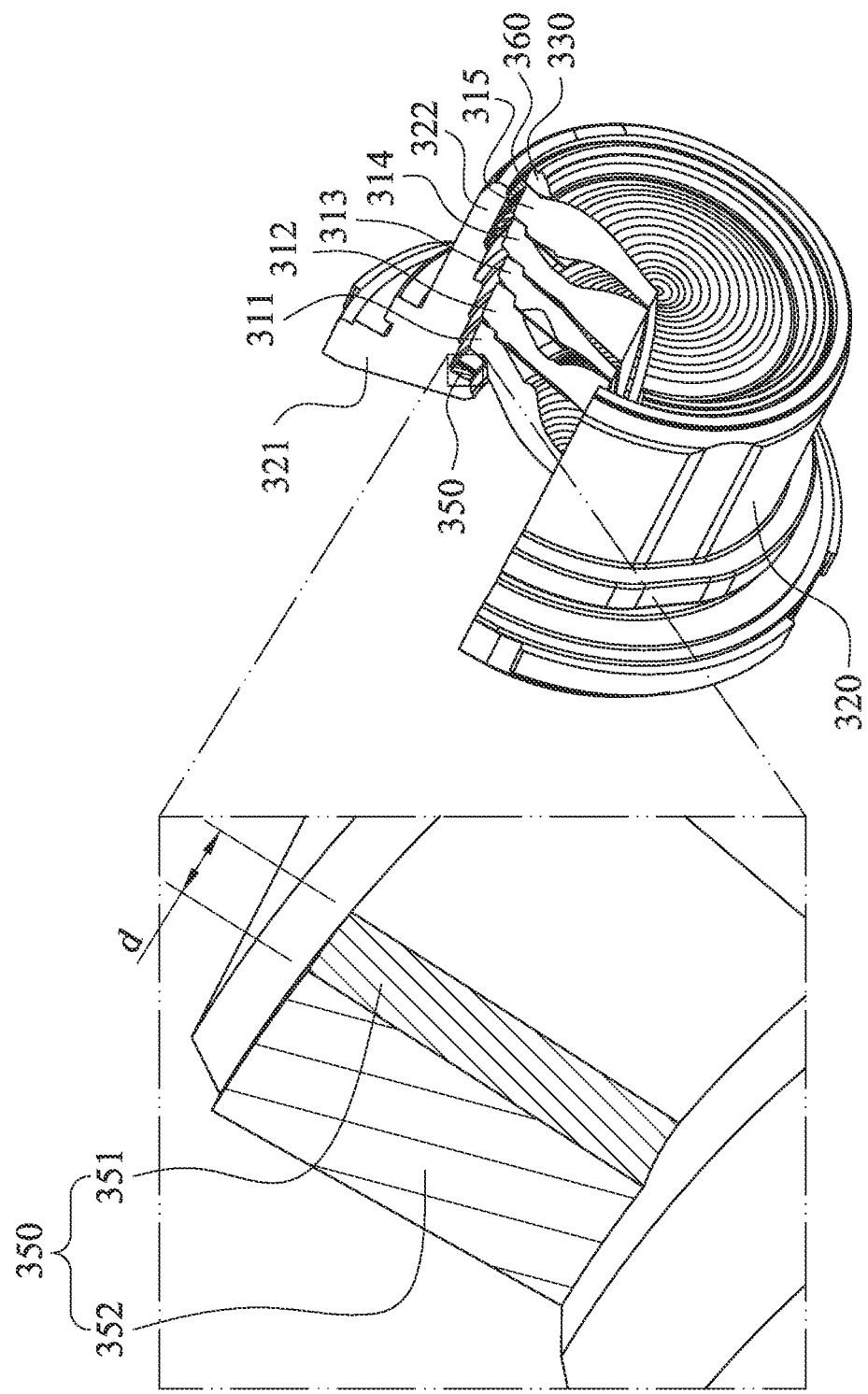
FIG. 3E is a partial schematic view of the imaging lens assembly according to the 3rd embodiment of FIG. 3A.
Figure 3F:
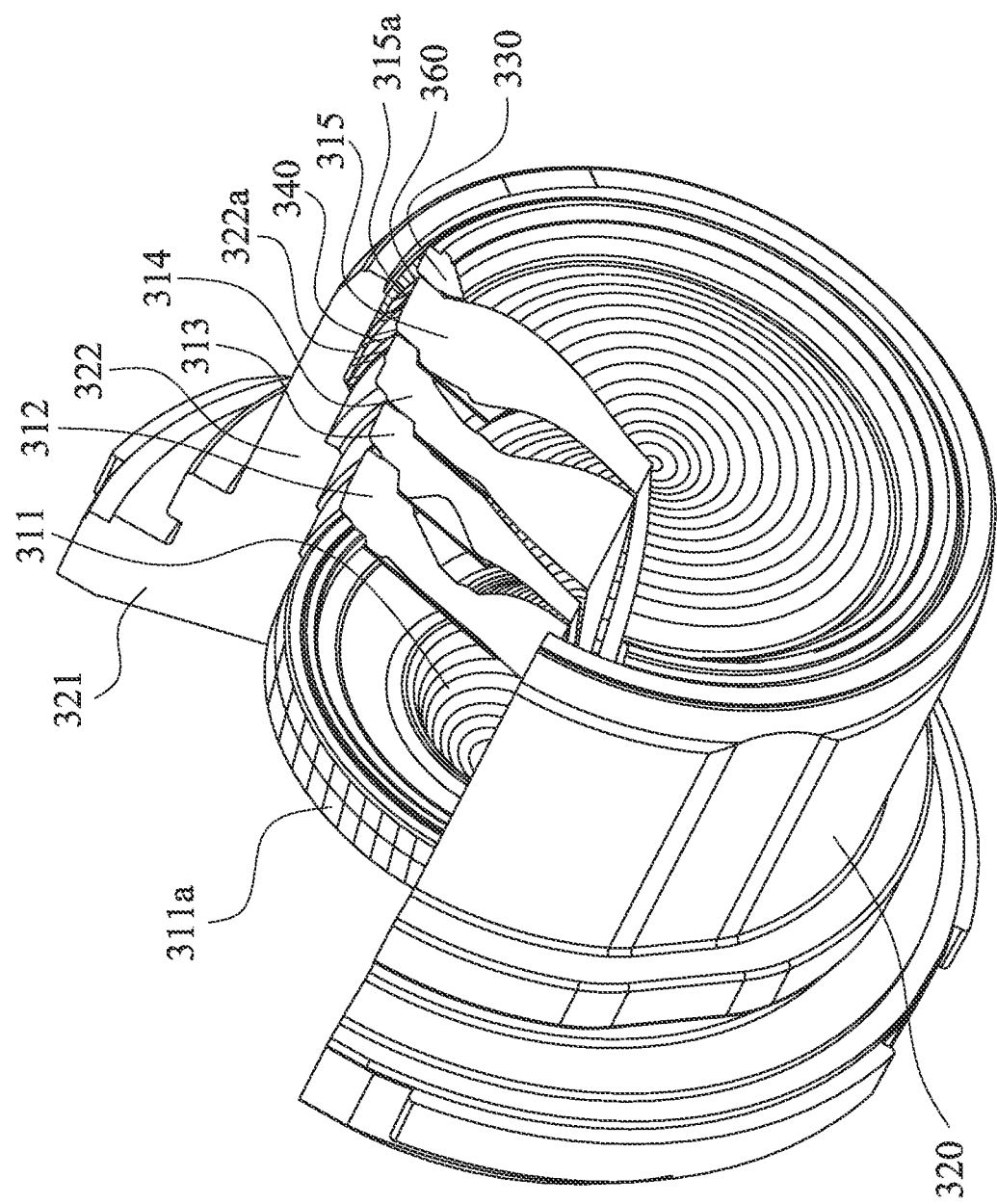
FIG. 3F is a partial cross-sectional view of the imaging lens assembly according to the 3rd embodiment of FIG. 3A.

FIG. 3A is a schematic view of an imaging lens assembly 300 according to the 3rd embodiment of the present disclosure. FIG. 3B is a cross-sectional view along the line 3B to 3B of the imaging lens assembly 300 according to the 3rd embodiment of FIG. 3A. FIG. 3C is a cross-sectional view along the line 3C to 3C of the imaging lens assembly 300 according to the 3rd embodiment of FIG. 3A. FIG. 3D is a three-dimensional view of the imaging lens assembly 300 according to the 3rd embodiment of FIG. 3A. FIG. 3E is a partial schematic view of the imaging lens assembly 300 according to the 3rd embodiment of FIG. 3A. FIG. 3F is a partial cross-sectional view of the imaging lens assembly 300 according to the 3rd embodiment of FIG. 3A. It is worth to be mentioned that, FIG. 3C is the figure of FIG. 3B flipped 45 degrees. In FIG. 3A to FIG. 3F, the imaging lens assembly 300 includes a plurality of plastic lens elements, the plastic lens barrel 320, a retaining element 330, a glue material 340, a first void structure 350 and an image surface 370. Therefore, the imaging lens assembly 300 can be provided so as to withstand the environmental test under high temperature and high humidity.

In FIGS. 3B, 3C, 3E and 3F, the plastic lens elements are arranged in order from an object side to an image side of the imaging lens assembly 300. In the 3rd embodiment, the imaging lens assembly 300 includes, in order from the object side to the image side, a first lens element 311 and the plastic lens elements 312, 313, 314, 315. The first lens element 311 is disposed on the side which nearest the object side of the imaging lens assembly 300, the plastic lens element 315 is disposed on the side which nearest the image side of the imaging lens assembly 300. Furthermore, the plastic lens elements can be disposed according to different imaging demands, and the amount of the plastic lens elements, the structures, the surface shapes and so on, more, the plastic lens elements can dispose other optical elements according to demand, but is not limited thereto.

In FIG. 3A to FIG. 3D, the plastic lens barrel 320 includes a plate portion 321 and a tube portion 322. The plate portion 321 has a central hole 321a, and an optical axis X of the imaging lens assembly 300 passes through the central hole 321a. The tube portion 322 is extended from the plate portion 321, which is parallel with the optical axis X and defines an inner space (its reference numeral is omitted), which is used to dispose the plastic lens elements in the inner space. Furthermore, the retaining element 330 is for fixing the plastic lens elements in the inner space, and the retaining element 330 can be a retainer made by a plastic ring element, or a ring element made by a solidified liquid glue material which coated annularity, but is not limited thereto. In the 3rd embodiment, the first lens element 311 and the plastic lens elements 312, 313, 314, 315 are disposed in the inner space of the tube portion 322, and the retaining element 330 is for fixing the first lens element 311 and the plastic lens elements 312, 313, 314, 315 in the inner space.

The first lens element 311 is physically contacted with the plate portion 321 of the plastic lens barrel 320. Furthermore, only the first lens element 311 of the plastic lens elements is physically contacted with the plate portion 321, other plastic lens elements are contacted with the tube portion 322, even do not contact any part of the plastic lens barrel 320, and the retaining element 330 is farther away from the first lens element 311 than the glue material 340 to the first lens element 311. In the 3rd embodiment, the plastic lens elements 312, 314, 315 are contacted with the tube portion 322, and the plastic lens element 313 is not contacted with any part of the plastic lens barrel 320.

In FIGS. 3B, 3C, 3E and 3F, the glue material 340 is disposed between one of the plastic lens elements and the tube portion 322 of the plastic lens barrel 320, and surrounds the one of the plastic lens elements. In the 3rd embodiment, the glue material 340 is disposed between the plastic lens element 315 and the tube portion 322 of the plastic lens barrel 320, and surrounds the plastic lens element 315. Furthermore, the glue material 340 can be further disposed between the plastic lens element 314 and the tube portion 322 of the plastic lens barrel 320, and can surround the plastic lens element 314. In detail, utilizing the retaining element 330 and the glue material 340 is favorable for enhancing the degree of destructive test and insertion/withdrawal test so as to elevate the degree of stability and the durability of the imaging lens assembly 300, that is, the retaining element 330 and the glue material 340 can reduce the influence from the environment of the resolution and the optical resolution so as to enhance the reliability of the imaging lens assembly 300.

Furthermore, the glue material 340 has an opaque property. Therefore, it is favorable for avoiding the unnecessary stray light reflection caused by the surface of the glue material 340.

In FIG. 3B and FIG. 3C, the first void structure 350 is extended from the central hole 321a to the tube portion 322, and the first void structure 350 is for maintaining an air gap (its reference numeral is omitted) between the first lens element 311 and the plate portion 321. In detail, under the environment test of high temperature and high humidity, the coefficient of linear thermal expansion of the glue material 340 will lead to change the distances between the constructed plastic lens elements, or the over expansion of the volume of the glue material 340 will damage the plastic lens barrel 320. Therefore, under the premise of utilizing the glue material 340, in order to maintain the durability of the imaging lens assembly 300 and eliminate the influence of stress made by the coefficient of linear thermal expansion of the glue material 340 at the same time, the first void structure 350 is favorable for amortizing the extra volume expansion of the plastic lens elements when the glue material 340 is over-heated so as to prevent the irreversible permanent deformation result from the accumulation of the stress. In detail, when the coefficient of linear thermal expansion of the glue material 340 is c, the following condition is satisfied: 5 ppm/° C.<c<400 ppm/° C.

In FIG. 3C and FIG. 3E, the first void structure 350 is disposed on the plate portion 321 of the plastic lens barrel 320, the first void structure 350 includes a first step 351 and a first descending surface 352. The first step 351 and the first descending surface 352 are for maintaining the air gap between the plate portion 321 and the first lens element 311 which is physically contacted with the plate portion 321. Due to the ventilation between the air gap and the central hole 321a, when amortize the extra volume expansion of the plastic lens elements, the air in the air gap can be exhausted smoothly, so that the expanded plastic lens elements can extend smoothly by the volume generated by the exhausted aft in the air gap.

In FIG. 3F, the tube portion 322 includes a plurality of inner annular surfaces 322a. The inner annular surfaces 322a are corresponding to the plastic lens elements, respectively, and the glue material 340 is disposed between an outer diameter surface of one of the plastic lens elements and each of the inner annular surfaces 322a is corresponding to each of the plastic lens elements. In the 3rd embodiment, the inner annular surfaces 322a are corresponding to the first lens element 311 and the plastic lens elements 312, 313, 314, 315. The first lens element 311 and the plastic lens element 315 have outer diameter surfaces 311a, 315a respectively. The glue material 340 is disposed between the outer diameter surface 315a of the plastic lens element 315 and the inner annular surfaces 322a corresponding to the plastic lens element 315. Hence, it is favorable for enhancing the package stability of the imaging lens assembly 300, so that the imaging lens assembly 300 will not be broken easily during suffering from the impact of the external force.

Figure 3G:
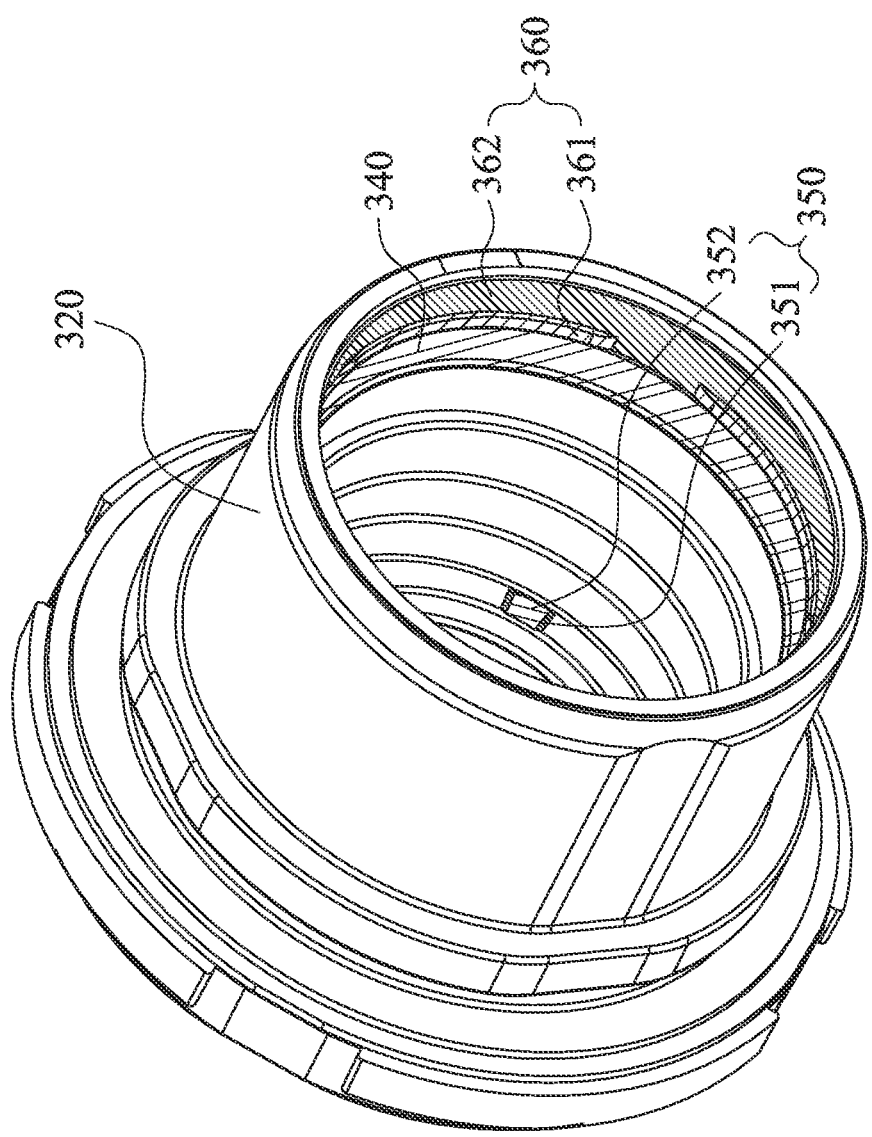
FIG. 3G is another three-dimensional view of the plastic lens barrel according the 3rd embodiment of FIG. 3A.
Figure 3H:
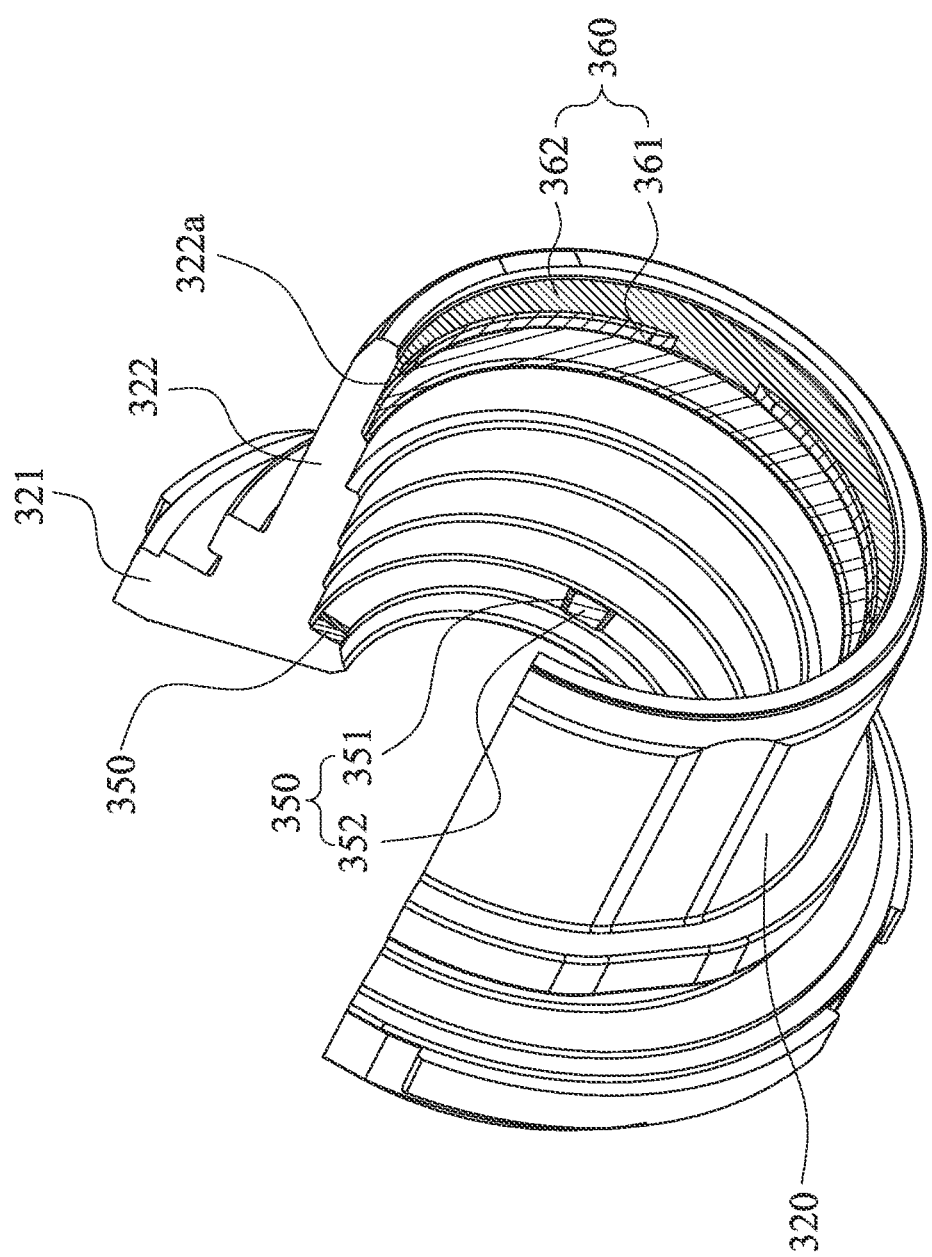
FIG. 3H is a partial cross-sectional view of the plastic lens barrel according to the 3rd embodiment of FIG. 3A.

FIG. 3G is another three-dimensional view of the plastic lens barrel 320 according the 3rd embodiment of FIG. 3A. FIG. 3H is a partial cross-sectional view of the plastic lens barrel 320 according to the 3rd embodiment of FIG. 3A. In FIG. 3B to FIG. 3H, the tube portion 322 of the plastic lens barrel 320 can further include a second void structure 360. The second void structure 360 is corresponding to the outer diameter surface of one of the plastic lens elements, the second void structure 360 includes a second step 361 and a second descending surface 362, and a part of the glue material 340 is disposed in the second void structure 360. In the 3rd embodiment, the second void structure 360 is corresponding to the outer diameter surface 315a of the plastic lens element 315. Therefore, it is favorable for amortizing the extra volume expansion from the heated and expanded glue material 340 so as to decrease the burden of the first void structure 350.

Furthermore, between the one of the plastic lens elements which is for disposing the glue material 340 and the first lens element 311 includes at least other two of the plastic lens elements. In the 3rd embodiment, between the plastic lens element 315 and the first lens element 311 includes plastic lens elements 312, 313, 314. Therefore, the glue material 340 can fix more plastic lens elements, and compensate the thermal expansion effect of the plastic lens elements due to the temperature variation. The overall focal length of the imaging lens assembly 300 will influenced by the coefficient of linear thermal expansion of the plastic lens elements, and the thermal expansion effect of the glue material 340 is favorable for discharging the influence of the thermal expansion effect of the plastic lens elements.

In FIG. 3B and FIG. 3E, when the thickness of the air gap is d, the outer diameter of the first lens element 311 is phi 1, and the outer diameter of one of the plastic lens elements (In the 3rd embodiment, one of the plastic lens elements means plastic lens element 315) which is contacted with the glue material 340 is phi i, the aforementioned parameters satisfy the following Table 3.

TABLE 3

| 3rd embodiment | | | |
|---|---|---|---|
| d (um) | 20 | phi i (mm) | 4.95 |
| phi 1(mm) | 4.3 | phi i/phi1 | 1.15 |

4th Embodiment

Figure 4A:
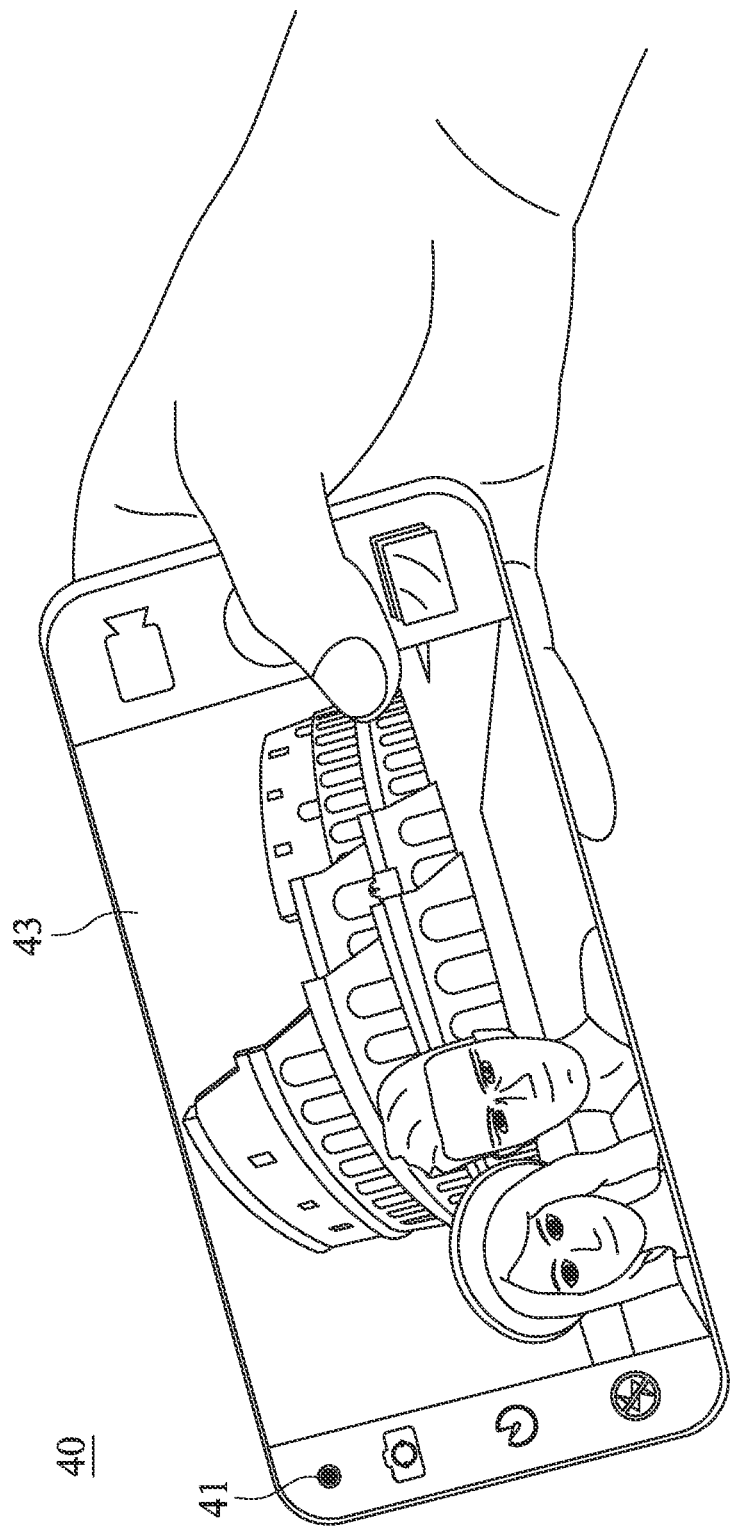
FIG. 4A is a schematic view of an electronic device according to the 4th embodiment of the present disclosure.
Figure 4B:
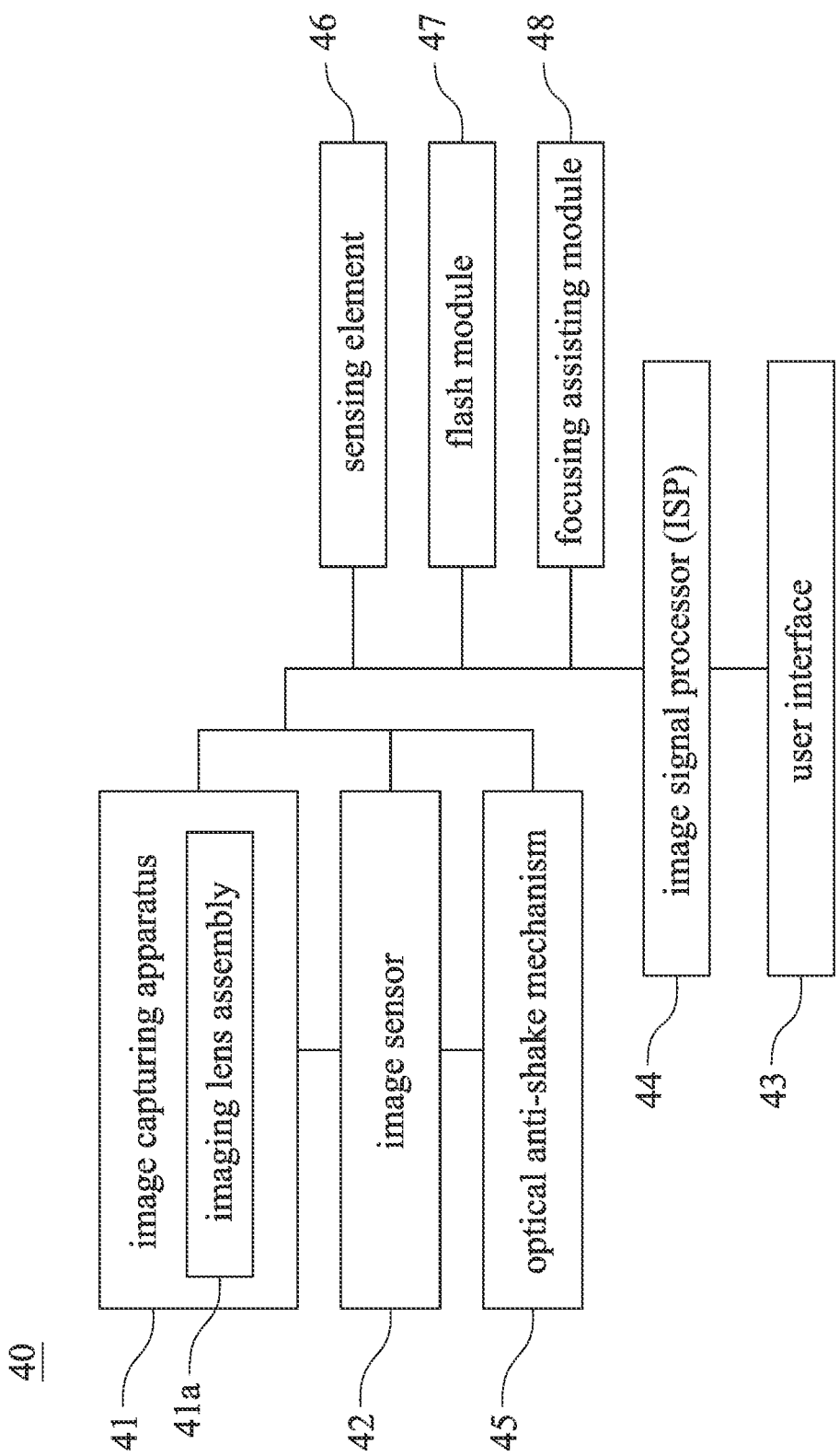
FIG. 4B is a block diagram of the electronic device according to the 4th embodiment of FIG. 4A.

FIG. 4A is a schematic view of an electronic device 40 according to the 4th embodiment of the present disclosure. FIG. 4B is a block diagram of the electronic device 40 according to the 4th embodiment of FIG. 4A. In FIG. 4A and FIG. 4B, the electronic device 40 is a smart phone which includes an image capturing apparatus 41 and an image sensor 42. The image capturing apparatus 41 includes an imaging lens assembly 41a, and the image sensor 42 is disposed to one of an image surface (its reference numeral is omitted) of the imaging lens assembly 41a. The image capturing apparatus 41 is disposed to a lateral area of an user interface 43. The user interface 43 can be a touch screen or a display screen, but is not limited thereto. The image capturing apparatus 41 can be anyone of the aforementioned in the 1st to the 3rd embodiments, but is not limited thereto.

Furthermore, users enter a shooting mode via the user interface 43 of the electronic device 40. At this time, the imaging light is gathered on the image sensor 42 via the image capturing apparatus 41, and an electronic signal about an image is output to an image signal processor (ISP) 44.

To meet a specification of the camera module of the electronic device 40, the electronic device 40 can further include an optical anti-shake mechanism 45, which can be an optical image stabilization (01S). Furthermore, the electronic device 40 can further include at least one auxiliary optical element (its reference numeral is omitted) and at least one sensing element 46. According to the 4th embodiment, the auxiliary optical element is a flash module 47 and a focusing assisting module 48. The flash module 47 can be for compensating a color temperature, and the focusing assisting module 48 can be an infrared distance measurement component, a laser focus module, etc. The sensing element 46 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 45 disposed on the image capturing apparatus 41 of the electronic device 40 can be enhanced to achieve the superior image quality. Furthermore, the electronic device 40 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

In addition, the electronic device 40 can further include, but not limited to the display unit, the control unit, the storage unit, the RAM, the ROM or other combinations.

Figure 4C:
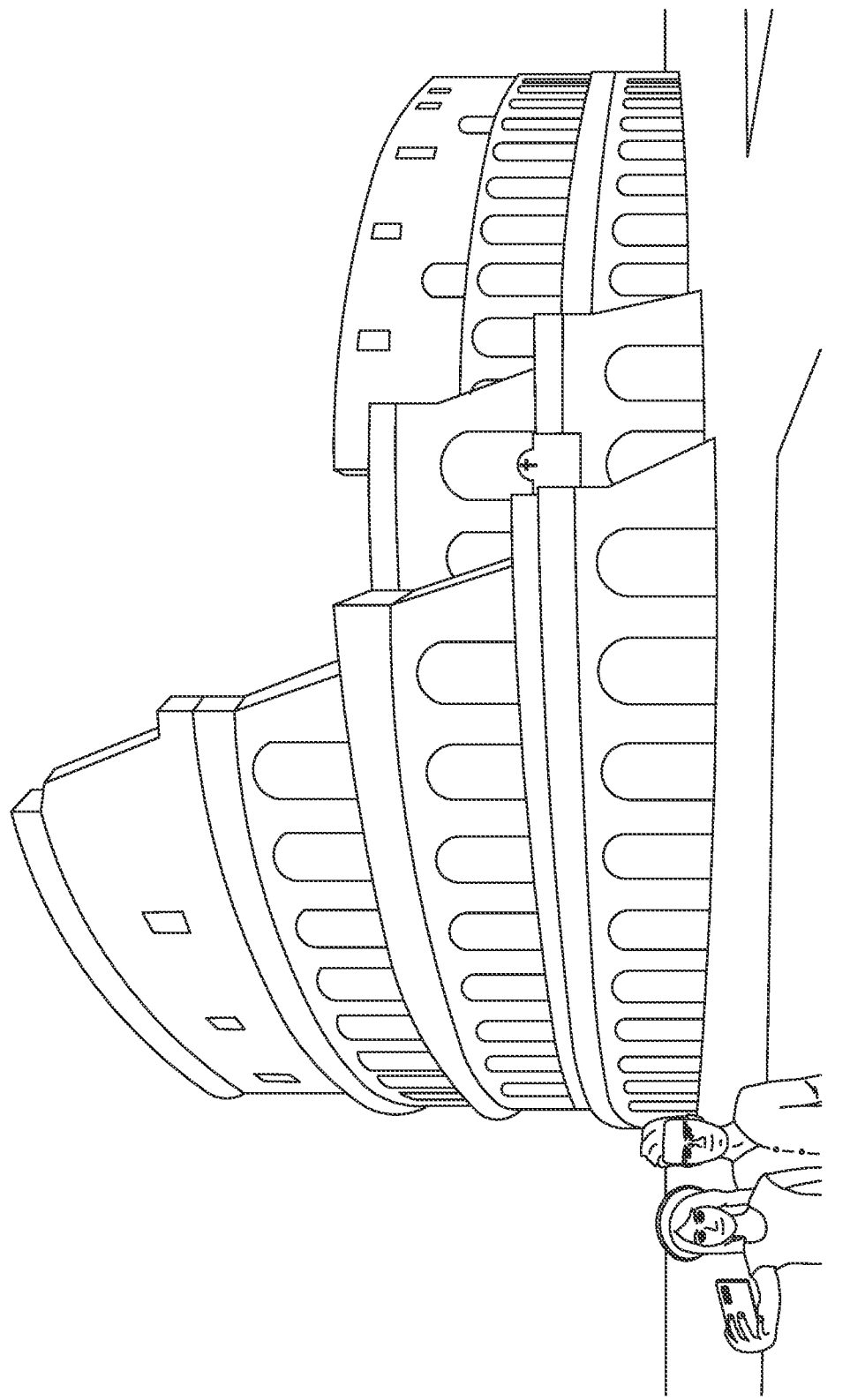
FIG. 4C is a schematic view of selfie scene according to the 4th embodiment of FIG. 4A.
Figure 4D:
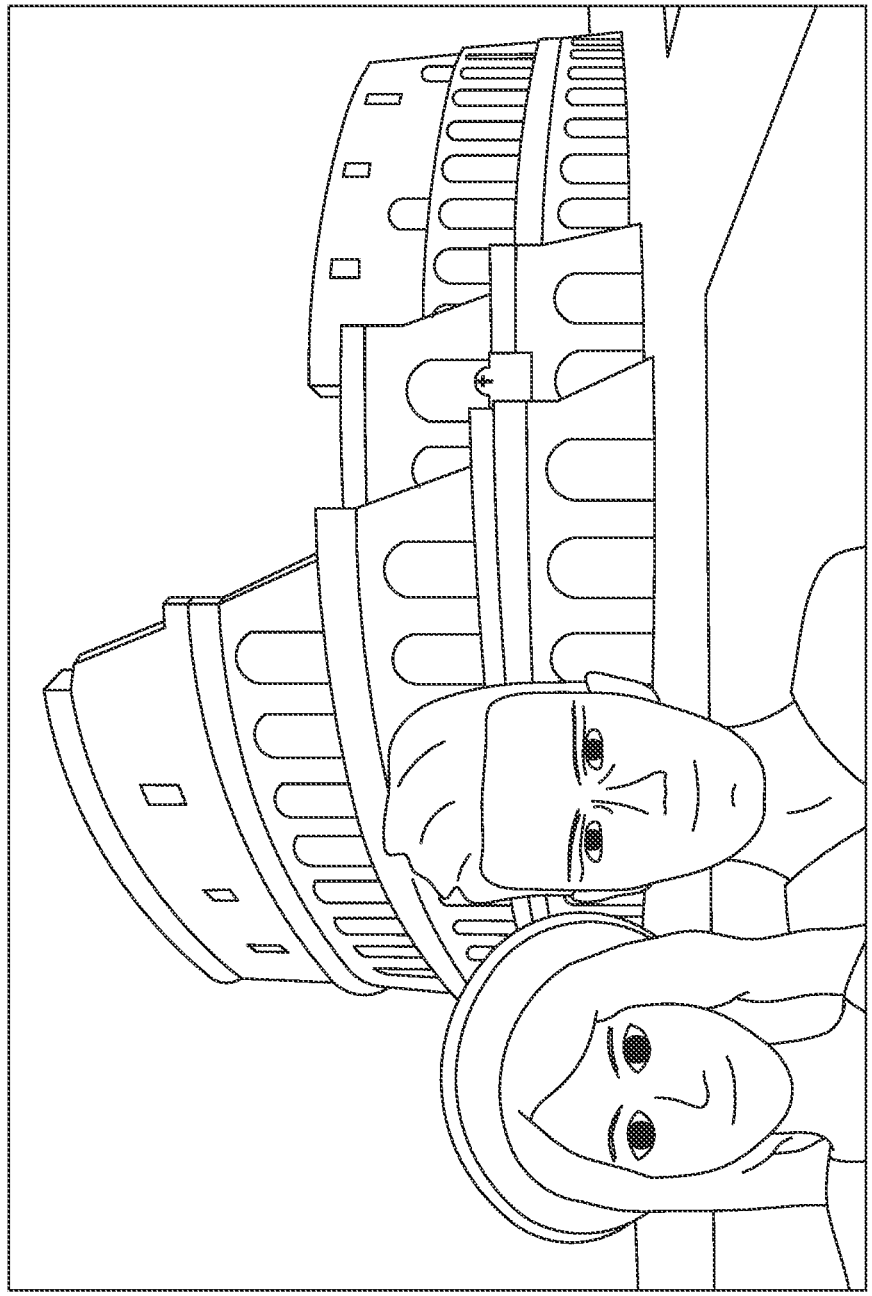
FIG. 4D is a schematic view of shot image according to the 4th embodiment of FIG. 4A.

FIG. 4C is a schematic view of selfie scene according to the 4th embodiment of FIG. 4A. FIG. 4D is a schematic view of a captured image according to the 4th embodiment of FIG. 4A. From FIG. 4A to FIG. 4D, the image capturing apparatus 41 and the user interface 43 face towards the users. When proceeding selfie or live streaming, the users can watch a captured image and operate an interface at the same time, and the capture image as FIG. 7D can be obtained after shooting. Therefore, better shooting experience can be provided via the image capturing apparatus 41 of the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
   a plurality of plastic lens elements;
   a plastic lens barrel comprising:
   a plate portion having a central hole, and an optical axis of the imaging lens assembly passing through the central hole;
   a tube portion extended from the plate portion which is parallel with the optical axis and defining an inner space, and the plastic lens elements disposed in the inner space;
   a retaining element for fixing the plastic lens elements in the inner space;

a glue material disposed between one of the plastic lens elements and the tube portion of the plastic lens barrel, and surrounding the one of the plastic lens elements; and a first void structure extended from the central hole to the tube portion;

wherein the tube portion comprises a plurality of inner annular surfaces, the inner annular surfaces corresponds to the plastic lens elements, respectively, the glue material is disposed between an outer diameter surface of the one of the plastic lens elements and each of the inner annular surfaces corresponding to the plastic lens elements, the plastic lens elements comprise a first lens element, and the first lens element is physically contacted with the plate portion of the plastic lens barrel;

wherein the first void structure is for maintaining an air gap between the first lens element and the plate portion, a thickness of the air gap is d, and the following condition is satisfied:

$$0.5 \text{ um} < d < 40 \text{ um}.$$

2. The imaging lens assembly of claim 1, wherein the first void structure is disposed on the plate portion of the plastic lens barrel, the first void structure comprises a first step and a first descending surface, and the first step and the first descending surface are for maintaining the air gap between the plate portion and the first lens element which is physically contacted with the plate portion.

3. The imaging lens assembly of claim 1, wherein the tube portion of the plastic lens barrel comprises:

a second void structure, the second void structure corresponding to the outer diameter surface of the one of the plastic lens elements, the second void structure comprising a second step and a second descending surface, and a part of the glue material disposed in the second void structure.

4. The imaging lens assembly of claim 1, wherein a coefficient of linear thermal expansion of the glue material is c, and the following condition is satisfied:

$$5 \text{ ppm/}° \text{C.} < c < 400 \text{ ppm/}° \text{C.}$$

5. The imaging lens assembly of claim 1, wherein the thickness of the air gap is d, and the following condition is satisfied:

$$0.5 \text{ um} < d < 23 \text{ um}.$$

6. The imaging lens assembly of claim 1, wherein an outer diameter of the first lens element is phi 1, an outer diameter of the one of the plastic lens elements which connected with the glue material is phi i, and the following condition is satisfied:

$$1.0 \leq \text{phi } i/\text{phi } 1 < 1.43.$$

7. The imaging lens assembly of claim 6, wherein between the one of the plastic lens elements connected with the glue material and the first lens element is disposed at least two other of the plastic lens elements.

8. The imaging lens assembly of claim 6, wherein the glue material has an opaque property.

9. An image capturing apparatus, comprising:
the imaging lens assembly of claim 1.

10. An electronic device comprising:
the image capturing apparatus of claim 9; and
an image sensor disposed on an image surface of the imaging lens assembly.

* * * * *